(12) United States Patent
Lawry et al.

(10) Patent No.: US 10,906,521 B2
(45) Date of Patent: Feb. 2, 2021

(54) SYSTEM AND METHOD FOR CONTROLLING AT LEAST ONE OF TRACTIVE OR BRAKING EFFORTS OF A VEHICLE SYSTEM

(71) Applicant: General Electric Company, Schenectady, NY (US)

(72) Inventors: Brian Douglas Lawry, Erie, PA (US); Jared Klineman Cooper, Melbourne, FL (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 433 days.

(21) Appl. No.: 15/811,122

(22) Filed: Nov. 13, 2017

(65) Prior Publication Data
US 2018/0065615 A1    Mar. 8, 2018

Related U.S. Application Data

(62) Division of application No. 13/975,903, filed on Aug. 26, 2013, now abandoned.

(60) Provisional application No. 61/833,180, filed on Jun. 10, 2013.

(51) Int. Cl.
| | |
|---|---|
| *B60W 10/04* | (2006.01) |
| *B61C 15/14* | (2006.01) |
| *B60W 10/18* | (2012.01) |
| *B60W 30/18* | (2012.01) |

(52) U.S. Cl.
CPC ............ *B60W 10/04* (2013.01); *B60W 10/18* (2013.01); *B60W 30/1819* (2013.01); *B61C 15/14* (2013.01)

(58) Field of Classification Search
None
See application file for complete search history.

(56) References Cited

U.S. PATENT DOCUMENTS

| | | |
|---|---|---|
| 3,593,076 A | 7/1971 | McSparran et al. |
| 2005/0065701 A1* | 3/2005 | Kumar ............... B61C 15/14 701/82 |

(Continued)

*Primary Examiner* — Todd Melton
*Assistant Examiner* — Jason R Roberson
(74) *Attorney, Agent, or Firm* — Philip S. Hof; The Small Patent Law Group, LLC

(57) ABSTRACT

System including an effort-monitoring system is configured to control tractive efforts (TEs) individually produced by propulsion-generating vehicles in a vehicle system. The effort-monitoring system is configured to control each of the propulsion-generating vehicles to provide a respective prescribed TE. The vehicle system operates at a system TE when each of the propulsion-generating vehicles is providing the respective prescribed TE. The prescribed TEs are determined by at least one of an operating plan of the vehicle system or a regulation that limits TE or ground speed of the vehicle system. In response to determining that a first propulsion-generating vehicle is providing a reduced TE that is less than the prescribed TE of the first propulsion-generating vehicle, the effort-monitoring system is configured to control a second propulsion-generating vehicle to exceed the prescribed TE of the second propulsion-generating vehicle so that the vehicle system is operating at or below the system TE.

20 Claims, 4 Drawing Sheets

(56) References Cited

U.S. PATENT DOCUMENTS

| | | | |
|---|---|---|---|
| 2005/0189886 A1* | 9/2005 | Donnelly | B61C 15/08 |
| | | | 318/52 |
| 2008/0051967 A1* | 2/2008 | Tarnow | B60L 3/10 |
| | | | 701/71 |
| 2008/0201028 A1 | 8/2008 | Brooks et al. | |
| 2011/0025267 A1* | 2/2011 | Kamen | B60L 55/00 |
| | | | 320/109 |
| 2013/0289811 A1* | 10/2013 | Tolkacz | B60W 10/06 |
| | | | 701/22 |
| 2014/0058570 A1* | 2/2014 | Kumar | B61C 15/00 |
| | | | 700/283 |
| 2018/0222502 A1* | 8/2018 | Paralikar | B61C 15/14 |

* cited by examiner

SYSTEM AND METHOD FOR CONTROLLING AT LEAST ONE OF TRACTIVE OR BRAKING EFFORTS OF A VEHICLE SYSTEM

CROSS-REFERENCE TO RELATED APPLICATIONS

The present application is a divisional application of pending U.S. application Ser. No. 13/975,903 (the "'903 Application"), filed on Aug. 26, 2013, which claims the benefit of U.S. Provisional Application No. 61/833,180 (the "'180 Application"), filed on Jun. 10, 2013. The '903 Application and the '180 Application are incorporated herein by reference in their entirety.

BACKGROUND

Embodiments of the subject matter described herein relate to systems and methods of controlling at least one of tractive or braking efforts of a vehicle system having a plurality of linked vehicles.

A vehicle system that includes multiple vehicles coupled together and configured to travel together along a route is known as a vehicle consist. A vehicle consist typically includes a propulsion-generating vehicle that is mechanically linked to one or more other vehicles, which may or may not be capable of generating propulsion. Propulsion-generating vehicles are capable of generating a tractive force (hereinafter referred to as "tractive effort") that propels the vehicle consist along a designated route and a braking force (hereinafter referred to as "braking effort") for slowing or stopping the vehicle. In systems where the vehicle consist includes multiple propulsion-generating vehicles, the vehicle consist may coordinate operations of the propulsion-generating vehicles to control movement of the vehicle consist. For example, one of the propulsion-generating vehicles may be designated as a principal or lead vehicle that controls the tractive and braking operations of the other propulsion-generating vehicles. In some cases, a vehicle system may include multiple vehicle consists that coordinate operations with one another to move the vehicle system. By way of example, a train may include a first locomotive consist that has a plurality of locomotives mechanically linked to one another and a second locomotive consist that has a plurality of locomotives mechanically linked to one another. The first and second locomotive consists are linked to each other and have principal locomotives that may communicate with each other to control movement of the train as a whole.

Vehicle systems are often configured to operate in accordance with one or more regulations (e.g., federal and/or state laws, federal and/or agency rules, etc.). For example, for at least some regions of North America, locomotives in a train are regulated to not exceed 180 klbs (or about 800 kilonewtons) of tractive effort (TE) per locomotive even though the locomotives may be capable of exceeding this limit. However, during operation of a train, at least one of the locomotives may generate a TE that is less than the maximum regulated TE (e.g., less than 180 klbs). As a specific example, a first locomotive may be incapable of providing the maximum TE due to conditions of the track (e.g., water, dirt, leaves, etc.), but a second locomotive, which follows the first locomotive, may be able to provide the maximum prescribed TE or more because the track is cleaned or cleared by the wheels of the first locomotive. Nonetheless, in this example, the train has a combined TE (160 klbs plus 180 klbs) that is less than what is permitted by regulation (i.e., 180 klbs plus 180 klbs). This inefficiency may reduce the pulling capabilities and/or speed of the train and may also increase the overall cost of operating the train.

Likewise, one or more regulations may prescribe a maximum braking effort (BE) by individual locomotives or for a locomotive consist that includes multiple locomotives. For example, locomotives typically include multiple traction motors that, in many cases, may be used for dynamic braking as well as providing traction. In dynamic braking, the traction motors become generators that are selectively controlled to slow rotation of the axles and, consequently, the corresponding vehicle. To comply with braking regulations, railroads may intentionally disable (i.e., "cut out") one or more traction motors during the build up or configuration of the train so that, during operation, the disabled traction motors are not capable of operating in a dynamic braking scheme. For instance, the traction motors of first and second locomotives in a locomotive consist may be used for dynamic braking, but only half of the traction motors in third and fourth locomotives of the locomotive consist may be enabled for dynamic braking. Limiting the number of traction motors that are available for dynamic braking consequently limits the braking capabilities of the train. This inefficiency may increase the overall cost of operating the train.

A vehicle system may also operate according to an operating plan, which can be referred to as a trip plan or mission plan. The operating plan prescribes tractive and braking efforts for each of the propulsion-generating vehicles throughout a designated trip (e.g., from a departure point to a destination). However, unpredictable events may occur during the trip or undesired conditions may exist along the route that require deviating from the operating plan. In the context of trains, one example of an unpredictable event may be a wheelset of a locomotive failing or becoming impaired during the trip (e.g., motor failure, speed sensor failure, and the like). One example of an undesired condition may include the railroad tracks being covered with ice or wet leaves that significantly reduce traction between the rails and the wheels.

BRIEF DESCRIPTION

In one embodiment, a system is provided that includes an effort-monitoring system configured to control vehicle tractive efforts (TEs) individually produced by plural propulsion-generating vehicles in a vehicle system to propel the vehicle system along a route. The effort-monitoring system is configured to control each of the propulsion-generating vehicles to provide a respective prescribed TE. The vehicle system operates at a system TE when each of the propulsion-generating vehicles is providing the respective prescribed TE. The prescribed TEs are determined by at least one of an operating plan of the vehicle system or a first regulation that limits TE or ground speed of the vehicle system. In response to determining that a first vehicle of the plural propulsion-generating vehicles is providing a reduced vehicle TE that is less than the prescribed TE of the first vehicle, the effort-monitoring system is configured to control a second vehicle of the plural propulsion-generating vehicles to exceed the prescribed TE of the second vehicle so that the vehicle system is operating at or below the system TE.

In one embodiment, a method of operating a vehicle system is provided. The method includes controlling plural propulsion-generating vehicles to individually produce a prescribed TE during a tractive operation. The vehicle system operates at a system TE when each of the propulsion-generating vehicles is providing the respective prescribed TE. The prescribed TEs are determined by at least one of an operating plan of the vehicle system or a first regulation that limits TE or ground speed of the vehicle system. The method also includes controlling, in response to determining that one of the propulsion-generating vehicles is providing a reduced vehicle TE that is less than the respective prescribed TE, at least one of the other propulsion-generating vehicles to exceed the respective prescribed TE so that the vehicle system is operating at or below the system TE.

In an embodiment, a system is provided that includes an effort-monitoring system configured to control vehicle TEs individually produced by plural propulsion-generating vehicles in a vehicle system to propel the vehicle system along a route. The TE that is individually produced by each of the propulsion-generating vehicles is associated with a previously defined limit that prohibited generation of the TE in excess of the previously defined limit. The effort-monitoring system is configured to allocate a system TE produced by the propulsion-generating vehicles in the vehicle system among the propulsion-generating vehicles such that the TE produced by at least one of the propulsion-generating vehicles exceeds the previously defined limit while the system TE remains at or below a system effort limit.

In an embodiment, a method of operating a vehicle system is provided. The method includes controlling vehicle TEs individually produced by plural propulsion-generating vehicles to propel the vehicle system along a route. The TE that is individually produced by each of the propulsion-generating vehicles is associated with a previously defined limit that prohibited generation of the TE in excess of the previously defined limit. The method also includes allocating a system TE produced by the propulsion-generating vehicles in the vehicle system among the propulsion-generating vehicles such that the TE produced by at least one of the propulsion-generating vehicles exceeds the previously defined limit while the system TE remains at or below a system effort limit.

In an embodiment, a system is provided that includes an effort-monitoring system configured to control operations of a vehicle system having discrete first and second vehicles that are linked directly or indirectly to each other in the vehicle system. The first and second vehicles are configured to provide respective first and second TEs to propel the vehicle system along a designated route. The first and second TEs provide a system TE that represents a combined effort of at least the first and second vehicles for propelling the vehicle system along the route. The system TE is prescribed by regulation to be at most a designated effort limit. The effort-monitoring system is configured to determine that one of the first or second TEs is insufficient for causing the combined effort to reach the system effort limit. The effort-monitoring system is configured to increase, in response to determining that one of the first or second TEs is insufficient, the TE of the other vehicle so that the system TE approaches the system effort limit.

In an embodiment, a method of operating a vehicle system is provided in which the vehicle system has discrete first and second vehicles that are linked directly or indirectly to each other in the vehicle system. The method includes controlling the first and second vehicles to provide respective first and second TEs to propel the vehicle system along a designated route. The first and second TEs provide a system TE that represents a combined effort of at least the first and second vehicles for propelling the vehicle system along the route. The system TE is prescribed by regulation to be at most a designated effort limit. The method also includes determining that one of the first or second TEs is insufficient for causing the combined effort to reach the system effort limit and increasing, in response to determining that one of the first or second TEs is insufficient, the TE of the other vehicle so that the system TE approaches the system effort limit.

In an embodiment, a system is provided that includes an effort-monitoring system configured to control operations of a vehicle system including a plurality of discrete vehicles that are directly or indirectly linked to each other in the vehicle system. The vehicle system includes a first wheelset and a second wheelset in which each of the first and second wheelsets provides a respective axle TE for propelling the vehicle system along a designated route. The second wheelset is spaced apart from and follows the first wheelset when traveling along the route. The effort-monitoring system is configured to receive axle data that is representative of an operating condition of the first wheelset at a designated point along the route. The effort-monitoring system is configured to determine, based on the axle data, that slippage has occurred at the designated point along the route. The effort-monitoring system may be configured to decrease the axle TE of the second wheelset before the second wheelset passes the designated point along the route to reduce a likelihood of slippage occurring with respect to the second wheelset.

In an embodiment, a method of operating a vehicle system is provided in which the vehicle system has a plurality of discrete vehicles that are directly or indirectly linked to each other in the vehicle system. The method includes controlling first and second wheelsets to provide respective axle TEs for propelling the vehicle system along a designated route. The second wheelset is spaced apart from and following the first wheelset when traveling along the route. The method may also include receiving axle data that is representative of an operating condition of the first wheelset and determining that slippage has occurred with respect to the first wheelset at a designated point along the route based on the axle data. The method may also include decreasing the axle TE of the second wheelset before the second wheelset is at the designated point to reduce a likelihood of slippage occurring with respect to the second wheelset.

DETAILED DESCRIPTION

Figure 1:
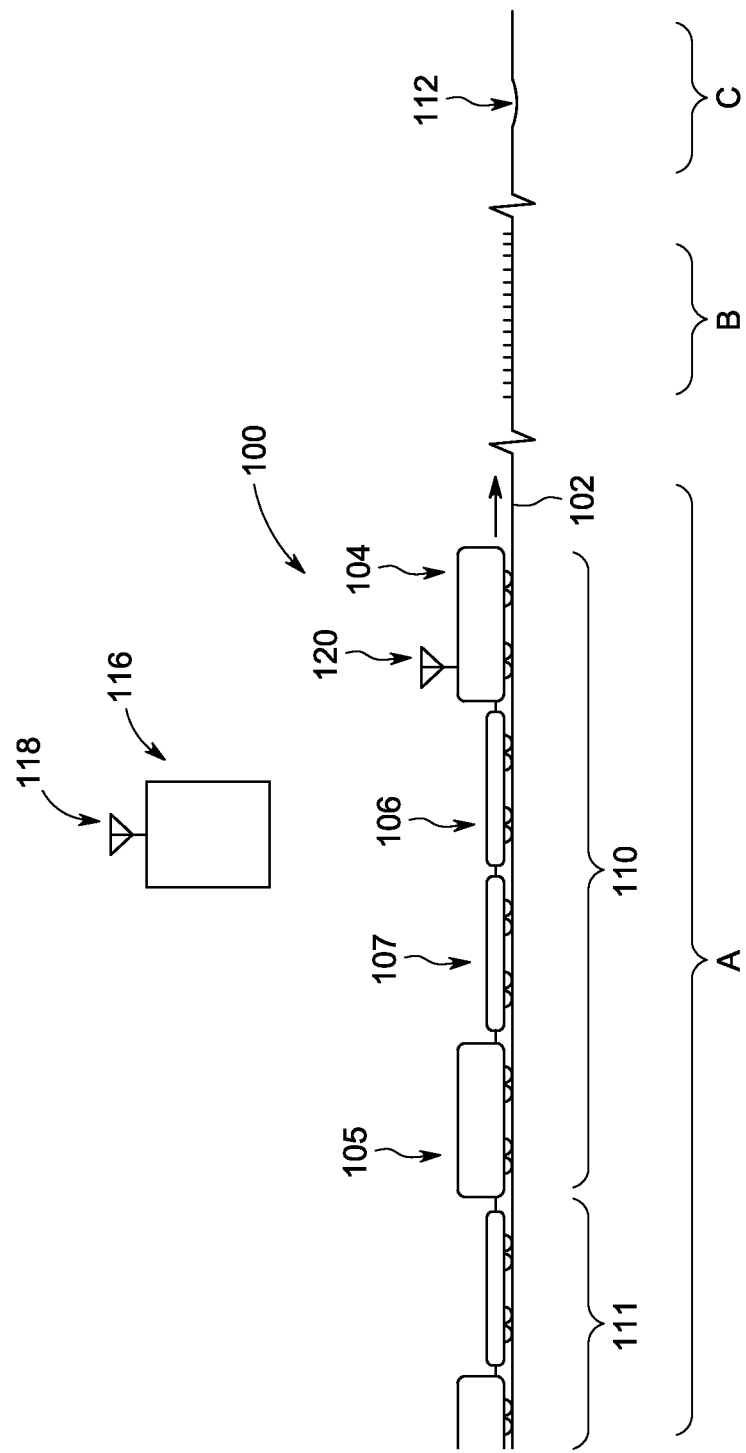
FIG. 1 is a schematic diagram of one embodiment of a vehicle system having a plurality of propulsion-generating vehicles.

One or more embodiments of the inventive subject matter described herein provide methods and systems for controlling vehicle tractive efforts (TEs) and/or vehicle braking efforts (BEs) of a vehicle system (e.g., powered vehicle system) that includes a plurality of discrete vehicles that are mechanically linked (e.g., coupled) to each other. The vehicle system includes at least one propulsion-generating vehicle that generates vehicle TE for propelling the vehicle system. For those embodiments that include multiple propulsion-generating vehicles, the multiple propulsion-generating vehicles may be arranged into a single vehicle consist or a plurality of vehicle consists. The propulsion-generating vehicles of a single vehicle consist are configured to communicate with each other to coordinate vehicle TEs and/or vehicle BEs to achieve a designated consist TE and/or a designated consist BE. For example, when a vehicle TE of one propulsion-generating vehicle is less than required by an operating plan, the vehicle TEs of one or more other vehicles in the vehicle consist or in the vehicle system may be increased to compensate for the reduced TE.

As used herein, a "prescribed TE" is a vehicle TE that a propulsion-generating vehicle is instructed or configured to provide for at least a portion of a designated route. For example, the prescribed TE may be based on one or more regulations (e.g., federal and/or state laws, federal and/or agency rules, etc.) that limit an amount of TE that can be generated by a propulsion-generating vehicle or vehicle system or a ground speed of the vehicle system. The prescribed TE may also be based on an operating plan. For example, the operating plan may include instructions for one or more propulsion-generating vehicles to operate at a designated notch for portion of the designated route. As used herein, a "reduced TE" is a vehicle TE that is less than the prescribed TE, respectively. The vehicle TE may be reduced when, for example, the propulsion-generating vehicle encounters a poor route condition and/or a component of the traction-providing element is impaired. Embodiments may detect that the propulsion-generating vehicle is providing a reduced TE or that route conditions will necessitate a reduced TE. An "axle TE," as used herein, refers to a portion of the vehicle TE that is provided by an axle or wheelset. For example, a vehicle TE for a propulsion-generating vehicle may be the sum of the axle TEs of the individual wheelsets in the vehicle.

As used herein, a "prescribed BE" is a BE that a propulsion-generating vehicle is instructed or configured to provide for at least a portion of a designated route. For example, the prescribed BE may be based on one or more regulations (e.g., federal and/or state laws, federal and/or agency rules, etc.) that limit an amount of BE that can be generated by a propulsion-generating vehicle or vehicle system. The prescribed BE may also be based on an operating plan. For example, the operating plan may include instructions for one or more propulsion-generating vehicles to provide a BE for a portion of the designated route. As used herein, a "reduced BE" is a BE that is less than the prescribed BE. The vehicle BE may be reduced when, for example, the propulsion-generating vehicle encounters a poor route condition and/or a component of the traction-providing element is impaired. As used herein, an "axle BE" refers to the portion of the vehicle BE that is provided by an axle or wheelset. For example, a BE for a propulsion-generating vehicle may be the sum of the axle BEs of the individual wheelsets in the vehicle.

An operating plan, which may also be referred to as a trip plan or mission plan, may include instructions for controlling the propulsion-generating vehicles to provide designated TEs and/or designated BEs for predetermined portions of a trip. The instructions may be expressed as a function of time and/or distance of a trip along a route. The vehicle system may be autonomously controlled according to the operating plan or the instructions of the operating plan may be presented to an operator of the vehicle system so that the operator can manually control the vehicle system according to the operating plan (also referred to as a "coaching mode"). The operating plans may be based on trip profiles, which may include, among other things, information about a geography of the route. The operating plans may also be based on operating information of the vehicle system, such as the size, weight, tractive effort, power output, weight distribution, and the like, of the vehicle system.

In some embodiments, the methods and systems set forth herein adjust operation of the vehicle system after detecting that an operating condition has changed. The change in operating condition may be a change in TE or BE provided by a designated vehicle or a change in TE or BE provided by an individual traction-providing element (e.g., a single wheelset) of a vehicle. The change in TE or BE may be detected and the operations of the vehicle system may be automatically adjusted to compensate for the change in TE or BE. For example, when a leading vehicle encounters an adverse route condition that causes slippage, the TE of the leading vehicle may be automatically reduced to prevent or reduce slippage. Consequently, the TE of one or more of the trailing vehicles may be increased to compensate for the reduced TE of the leading vehicle. Similarly, the BE may be increased to compensate for a reduced BE of the leading vehicle.

Methods and systems set forth herein may also adjust operation of the vehicle system after determining a designated route condition exists at one more points or segments of the route. Route conditions may affect the traction of the vehicle system along the route. For example, in the context of trains or automobiles, the route condition may relate to a friction (or adhesion) coefficient between the wheels and the route (e.g., track or road). A change in route condition may affect an overall performance of the vehicle system. After detecting the change in route condition, embodiments may adjust operation of one or more of the traction-providing elements. For example, the TEs or the BEs of one or more vehicles may be increased with respect to another vehicle. In more particular embodiments, the TE of a first wheelset of a vehicle may be increased with respect to a second wheelset of the same vehicle or with respect to another wheelset of a different vehicle. In other cases, the BE of a first wheelset of a vehicle may be increased with respect to a second wheelset of the same vehicle or with respect to another wheelset of a different vehicle.

In some cases, after determining that a propulsion-generating vehicle is providing less than the prescribed TE or BE, embodiments may maximize, improve, or optimize the system TE or BE by instructing another propulsion-generating vehicle to provide an over-prescribed amount of TE or BE. As used herein, terms like "maximize," "minimize," "improve," or "optimize" (and forms thereof) are not intended to require maximizing or minimizing a characteristic, parameter, or other objective without consideration of other factors. Instead, the terms "maximize," "minimize," "improve," or "optimize" (and forms thereof) may include increasing or decreasing (as appropriate) a characteristic, parameter, or other objective toward a designated or desired amount while also satisfying other conditions. For example, optimized TEs may not be limited to achieving a maximum level of TEs for the vehicle system. Rather, optimizing the TEs may mean that the TEs are increased or improved, but not necessarily maximized, while also satisfying other conditions (e.g., regulations, trip duration, arrival time, wheel creep, etc.). Similarly, optimizing the BEs may mean that the BEs are increased or improved, but not necessarily maximized, while also satisfying other conditions (e.g., regulations, trip duration, arrival time, wheel creep).

As described herein, the regulations that prescribe a particular TE or BE may be one or more laws enacted by government (e.g., federal, state, regional, county, city, and the like) and/or one or more rules implemented by an agency. For example, the Federal Railroad Administration (FRA) of the U.S. Department of Transportation prescribes various rules that dictate operation of a train. At least some rules dictate or prescribe maximum TE values per locomotive regardless of the TE values of the other locomotives of the same rail vehicle system. In other words, each of the locomotives may be required to follow a previously defined limit that prohibits generation of TE in excess of the limit whether or not the other locomotives are producing TE at the limit. Furthermore, at least some rules dictate or prescribe maximum BE values per locomotive or per consist regardless of the BE values of the other locomotives or other consists of the same rail vehicle system. In other words, each of the locomotives may be required to follow a previously defined limit that prohibits generation of BE in excess of the limit whether or not the other locomotives are producing BE at the limit.

In some cases, a regulation may include a TE limit for a vehicle system that limits the TE for the vehicle system as a whole or a TE limit for a vehicle consist that limits the TE for the vehicle consist as a whole. The TE limit for a vehicle system is hereinafter referred to as a "system effort limit," and the TE limit for a vehicle consist is hereinafter referred to as a "consist effort limit." However, it is possible that the regulations may permit individual propulsion-generating vehicles to exceed the previously defined limit for the vehicle provided that the system effort limit and/or the consist effort limit is not exceeded. As such, embodiments described herein may be configured to allocate a system TE produced by the propulsion-generating vehicles in the vehicle system among the propulsion-generating vehicles such that the TE produced by at least one of the propulsion-generating vehicles exceeds the previously defined limit while the system TE remains at or below a system effort limit. Likewise, embodiments described herein may be configured to allocate a consist TE produced by the propulsion-generating vehicles in the vehicle consist among the propulsion-generating vehicles such that the TE produced by at least one of the propulsion-generating vehicles exceeds the previously defined limit while the consist TE remains at or below a consist effort limit. In particular embodiments, the system effort limit (or the consist effort limit) is based on the previously defined limit and a number of the propulsion-generating vehicles in the vehicle system (or the vehicle consist).

To illustrate one example, if the previously defined limit was 180 klbs per vehicle and the vehicle system includes first, second, and third propulsion-generating vehicles, then the system TE is 540 klbs for the vehicle system. Embodiments described herein may allocate or apportion the TEs of the individual vehicles so that the TE of the system is approximately equal to the system effort limit or is as close to the system effort limit as reasonably allowed (e.g., due to route conditions or other operating conditions). If the first propulsion-generating vehicle can only generate 160 klbs due to route conditions, embodiments may apportion the system TE such that the second propulsion-generating vehicle generates 175 klbs and the third propulsion-generating vehicle generates 205 klbs. As such, the system TE may be approximately equal to the system effort limit even though the TE for one of the vehicles exceeds the previously defined limit of 180 klbs.

As another example, if the previously defined limit was 200 klbs per vehicle and a vehicle consist includes first, second, third, and fourth propulsion-generating vehicles, then the consist effort limit may be 800 klbs for the vehicle consist. If the first and second propulsion-generating vehicles can only generate 180 klbs and 190 klbs, respectively, embodiments may allocate the consist TE such that each of the third and fourth propulsion-generating vehicles generates 215 klbs. As such, the consist TE may be approximately equal to the consist effort limit even though the TE for two of the vehicles exceeds the previously defined limit of 200 klbs.

It is understood that the above examples are only used for illustrative purposes and are not intended to be limiting. The previously defined limits and/or prescribed TEs may have a variety of values. Moreover, other embodiments may have only two propulsion-generating vehicles or at least five propulsion-generating vehicles.

As used herein, a "vehicle system" may include a single propulsion-generating vehicle or multiple propulsion-generating vehicles. For those embodiments that include multiple propulsion-generating vehicles, the multiple propulsion-generating vehicles may be arranged into a single vehicle consist or a plurality of vehicle consists. In some cases, the regulations may be directed to each individual consist and/or an entire vehicle system that includes multiple consists. For example, the regulations may prescribe a consist TE limit for each of the individual consists and also a system TE limit for the vehicle system.

As one specific example, a train may include first, second, and third locomotive consists, wherein each of the locomotive consists includes two locomotives. The regulations may prescribe a consist TE limit such that each of the first, second, and third locomotive consists may not exceed 400 klbs/consist. Likewise, the regulations may prescribe a system TE limit such that the train may not exceed 1200 klbs. Embodiments described herein may selectively control the locomotives so that the regulations directed toward the individual consists and directed toward the train as a whole are met.

Although the above examples refer to TEs, one or more regulations may also exist that prescribe a BE limit for a vehicle system (hereinafter referred to as a "system BE limit") that is not to be exceeded by the vehicle system and/or a BE limit for a vehicle consist (hereinafter referred to as a "consist BE limit") that is not to be exceeded by the vehicle consist.

In many cases, before the vehicle system determines that an operating condition has changed and/or that an adverse route condition exists, the vehicle system may be operating in accordance with an operating plan. The change in the operating condition and/or the determined route condition may not be part of the original operating plan. After identifying the change in the operating condition and/or that an adverse route condition exists, embodiments set forth herein may deviate from the operating plan or adjust operation of the vehicle system to achieve one or more goals of the operating plan. As one example, the vehicle system may permit or control a first traction-providing element (e.g., a propulsion-generating vehicle or one or more wheelsets of the propulsion-generating vehicle) to provide less TE (or BE) and control a second traction-providing element to provide more TE (or BE) so that the system TE (or BE) is maintained and one or more goals of the original operating plan is achieved.

At least one technical effect of embodiments described herein may include a more efficient control of the TEs and/or BEs of a vehicle system. The TEs and BEs may be controlled to provide greater fuel efficiency and/or greater tractive capabilities for dragging a load. Another technical effect may include a more continuous or seamless transition of vehicle operation after a route condition is detected or a change in operation has occurred. Another technical effect may include enabling automatic control of the vehicle system by automatically identifying route conditions that negatively affect traction and adjusting operation of the vehicle system accordingly and/or by automatically identifying a change in TE. Additional technical effects of embodiments may include a reduction in at least one of fuel consumption, fuel emissions, or human interaction with the vehicle system.

FIG. 1 is a schematic diagram of a vehicle system 100 formed in accordance with one embodiment. As shown, the vehicle system 100 is traveling along a portion of a route 102. While only one vehicle system 100 is shown in FIG. 1, it is understood that several vehicle systems may be concurrently traveling along different segments of the route 102. The vehicle system 100 includes a plurality of discrete vehicles. As used herein, "discrete" vehicles are separate and distinct vehicles that are capable of being removably coupled to and part of a larger vehicle system. The vehicle system 100 may be a rail vehicle system that includes at least one propulsion-generating vehicle (e.g., locomotive) and, optionally, at least one non-powered vehicle (e.g., rail car or passenger car) that are linked to one another. Rail vehicle systems may include trains, tram lines, monorails, subways, and the like. Accordingly, the route 102 is a track in the illustrated embodiment that is configured to operably engage the vehicle system 100.

However, the vehicle system 100 may be or include other types of propulsion-generating and non-powered vehicles. Non-limiting examples of other types of vehicles that may be used with embodiments set forth herein include mining equipment, construction equipment, farming equipment, other off-highway vehicles (e.g., vehicles that are not designed or allowed by law or regulation to travel on public roads, highways, and the like), marine vessels, and the like. Accordingly, the route may be another type of track, road, waterway, or other route across which a vehicle system may travel.

In the illustrated embodiment, the vehicle system 100 includes propulsion-generating vehicles 104 and 105 and non-powered vehicles 106 and 107 that are mechanically linked to one another and are configured to travel as a group along the route 102. The terms "powered" or "propulsion-generating" refer to the capability of a vehicle to propel itself and not whether the vehicle receives energy for one or more other purposes. For example, the non-powered vehicles 106, 107 may receive electric current to power one or more loads disposed on-board the non-powered vehicles 106, 107 (e.g., air conditioning, lighting, etc.).

In FIG. 1, the propulsion-generating vehicle 104 may be considered a principal or lead vehicle of a vehicle consist 110, and the propulsion-generating vehicle 105 may be considered a remote vehicle of the vehicle consist 110. A propulsion-generating vehicle that controls one or more other propulsion-generating vehicles may be referred to as "principal" or "lead" propulsion-generating vehicle, and propulsion-generating vehicles that are controlled by another propulsion-generating vehicle may be referred to as "remote" propulsion-generating vehicles. The plurality of propulsion-generating vehicles 104, 105 in the single vehicle consist 110 are configured to operate as a single moving apparatus. For example, the multiple propulsion-generating vehicles 104, 105 may be controlled by an effort-monitoring system that coordinates TE and/or BEs to control operation of the vehicle system 100, which includes the vehicle consist 110.

A vehicle system may be or include a single vehicle consist or include a plurality of vehicle consists that are directly or indirectly coupled to another. For example, the vehicle system 100 includes a second vehicle consist 111 that is coupled to the vehicle consist 110. When a vehicle system includes multiple vehicle consists, the vehicle consists may be referred to as sub-consists. If the vehicle system includes multiple vehicle consists, the vehicle consists may be configured to operate as a single moving apparatus. For example, the multiple vehicle sub-consists may be controlled by a master computing system that coordinates tractive and/or braking efforts among the sub-consists to control operation of the vehicle system as a whole.

In some embodiments, the vehicle system 100 is characterized as having a distributed power system or being capable of operating in different modes. In a distributed power system, different propulsion-generating vehicles (or different vehicle consists) are capable of being controlled by a single master control system, which may be on a principal vehicle. For example, a single vehicle system may include first and second propulsion-generating vehicles. A master control system, which may be an effort-monitoring system of a single vehicle as described herein, for the vehicle system may instruct the first and second propulsion-generating vehicles in a manner that coordinates TEs and/or BEs of the vehicle system. More specifically, the master control system may communicate signals to the first and second propulsion-generating vehicles that include operating instructions. However, the master control system may communicate different instructions to each of them. For example, the first propulsion-generating vehicle may be instructed to operate at a high notch (or throttle) setting. At the same time, the second propulsion-generating vehicle may be instructed to operate at a lower notch setting or to apply brakes to the propulsion-generating vehicle.

Likewise, a master control system may instruct multiple vehicle consists. As one specific example, a vehicle system may include a leading vehicle consist and a trailing vehicle consist. As the vehicle system is traversing a mountain, the leading vehicle consist may crest the mountain top and travel on the downward slope of the mountain. At this time, the master control system may instruct the leading vehicle consist to cease tractive efforts and commence braking. The trailing vehicle consist, however, may not have passed the mountaintop and may still be climbing the mountain. If so, the master control system may instruct the trailing vehicle consist to maintain tractive efforts. By operating the leading and trailing vehicle consists in a different manner, tensile forces at the mechanical couplers that connect adjacent vehicles may be reduced. Accordingly, different propulsion-generating vehicles or different vehicle consists of a single vehicle system may operate asynchronously or independent from each other. This may also be referred to as operating according to an asynchronous mode, independent mode, or decoupled mode.

Embodiments are not limited to intra-consist communication for allocating or apportioning TE and/or BE within the same vehicle consist. Instead, multiple consists of the same vehicle system may communicate with each other to adjust TE and/or BE of the vehicle system. More specifically, the propulsion-generating vehicles of each of the vehicle consists 110, 111 may be configured to communicate with other propulsion-generating vehicles of the same vehicle consist (e.g., intra-consist communication) to coordinate TE and/or BE of the respective consist. The propulsion-generating vehicles of a single consist may be configured to adjust TE and/or BE of the different propulsion-generating vehicles to compensate for reduced TE and/or BE within the respective consist. In turn, the vehicle consists 110, 111 may communicate with each other (e.g., inter-consist communication) to coordinate TE and/or BE of the vehicle system 100 in a similar manner. The vehicle consists 110, 111 of the vehicle system 100 may be configured to adjust TE and/or BE of the different vehicle consists to compensate for reduced TE and/or BE within the vehicle system 100.

It is noted that the embodiment of FIG. 1 is provided for illustrative purposes only, as other arrangements, orientations, and/or numbers of propulsion-generating vehicles and/or non-powered vehicles may be used in other embodiments. In some embodiments, the propulsion-generating vehicle 104 may control the operations of other propulsion-generating vehicles, such as the propulsion-generating vehicle 105. In other embodiments, a propulsion-generating vehicle other than the propulsion-generating vehicle 104 may act to control the operations of one or more other propulsion-generating vehicles. For example, the propulsion-generating vehicle 105 may control operations of the propulsion-generating vehicle 104. In some cases, the principal vehicle that controls the vehicle system 100 is the leading vehicle (e.g., first vehicle) that controls operation of other vehicles. In other cases, the principal vehicle may follow or trail other propulsion-generating vehicles while traveling.

FIG. 1 also illustrates a plurality of route segments A-C along the route 102. As shown, the vehicle system 100 is traveling along the route segment A in a left-to-right direction along the page. Each of the route segments A-C may have a different route condition. The route condition may be, at least in part, based on a friction coefficient between a surface of the route (e.g., track, road, and the like) and a surface of the vehicle system that directly engages the surface of the route, such as the surface of a wheel. The route condition may also be based on a contour of the route. With respect to FIG. 1, the route segment A represents a portion of the route 102 that has a substantially ideal route condition. For example, the route segment A may be a portion of the route 102 that includes dry tracks that are not covered by unwanted matter, such as dirt or leaves, which can reduce the friction coefficient.

Route segments B and C illustrate segments that have adverse route conditions. In some embodiments, an adverse route condition is a condition that causes less traction between the vehicle system 100 and the route 102 than a route condition immediately before the adverse route condition. The adverse route condition may require the vehicle system 100 to change operating parameters (e.g., change tractive efforts) to improve or optimize the overall performance of the vehicle system after encountering the adverse route condition. For example, the route segment B represents a portion of the route 102 that has an adverse route condition such that adhesion between the vehicle system 100 and the route 102 is negatively affected. More specifically, the friction coefficient may be reduced. The adverse route condition may be caused by unwanted matter along the route 102. For example, the route segment B may have one or more portions that are lubricated, wet, iced, and/or have dirt, or other contaminants along the route (e.g., mud, leaves, wear debris, and the like). In many cases, a combination of different materials forms a film-like or slurry-like composition. Unwanted matter, such as the above, may reduce the friction (e.g., reduce the friction coefficient) between the vehicle system 100 and the route 102.

The route segment C represents a portion of the route 102 in which a change in physical structure or integrity of the route 102 may reduce contact between the vehicle system 100 and the route 102. In FIG. 1, the route segment C includes a recess 112 in which the route 102 abruptly dips. At the recess 112, the normal force against the route 102 may be decreased thereby reducing adhesion and traction. For example, the vehicle system 100 and the route 102 may be momentarily separated at the recess 112. Other adverse route conditions caused by a change in physical structure or integrity of the route 102 may exist. For example, the route 102 may not be secure (e.g., loose rail) or a localized area may be covered with loose material (e.g., gravel) that effectively reduces the friction between the route 102 and the vehicle system 100.

When a change in traction occurs as described above, the TE applied by a corresponding propulsion-generating vehicle may cause the traction-providing element to rotate excessively, which may be characterized as slippage. This slippage may have undesired effects on the vehicle system 100 and the route 102. Accordingly, the vehicle system 100 is configured to adjust the TE for the propulsion-generating vehicle that is experiencing slippage. Due to the adjustment in the TE for one propulsion-generating vehicle, the vehicle system 100 may be configured to adjust the TE of another propulsion-generating vehicle to compensate for the TE loss.

By way of example, as the vehicle system 100 travels along the route segment A, the route condition may permit and/or the operating plan may instruct that each of the propulsion-generating vehicles 104, 105 generate an approximately common TE. For example, each of the propulsion-generating vehicles 104, 105 may generate about 180 klbs (about 800 kilo-newtons). The common TE may be based on a system effort limit that is prescribed by regulation or a consist effort limit prescribed by regulation. The system effort limit may dictate that the system TE for the vehicle system 100 or the consist TE for the vehicle consist 110 should not exceed 180 klbs per propulsion-generating vehicle. As described above, in some instances, the vehicle system 100 may include only one vehicle consist. If that is the case, then the system TE may be equal to the consist TE. Thus, the system TE or the consist TE in this example is about 360 klbs (or about 1600 kilo-newtons).

When the propulsion-generating vehicle 104 engages the route segment B, the route condition of the route segment B may cause slippage or otherwise cause the vehicle TE of the propulsion-generating vehicle 104 to reduce. For example, the propulsion-generating vehicle 104 may be equipped with sensors that detect slippage is occurring and/or that the propulsion-generating vehicle 104 may benefit by reducing the TE. As such, the TE for the propulsion-generating vehicle 104 may be decreased to reduce the likelihood of the slippage continuing.

Before, during, or after the TE of the propulsion-generating vehicle 104 is decreased, the vehicle system 100 may determine that the decreased TE generated by the propulsion-generating vehicle 104 is or will be insufficient for causing the combined effort to reach the system effort limit.

Upon determining that the decreased TE of the propulsion-generating vehicle 104 is insufficient, embodiments may increase the TE of the propulsion-generating vehicle 105 so that the TE for the vehicle system 100 approaches the system effort limit. In some cases, the TE of the propulsion-generating vehicle 105 may be increased so that the system TE is approximately equal to the system effort limit. Similarly, the TE of the propulsion-generating vehicle 105 may be increased so that the consist TE is approximately equal to the consist effort limit.

In some embodiments, the vehicle system 100 may determine that an adverse route condition exists and that it may be desirable to change the tractive operations of the propulsion-generating vehicle 104 to improve or optimize the performance of the vehicle system 100. For example, the vehicle system 100 may determine that the propulsion-generating vehicle 104 is incapable of maintaining a designated TE without an unwanted effect occurring (e.g., slippage, damage to the propulsion-generating vehicle, inefficient use of fuel, etc.). As a specific example, the vehicle system 100 may identify that an improved or optimized wheel creep of the propulsion-generating vehicle 104 will cause the system TE to decrease below the system effort limit. Accordingly, the vehicle system 100 may instruct the propulsion-generating vehicle 105 to increase the corresponding TE to compensate for the reduced TE of the propulsion-generating vehicle 104.

As described herein, embodiments may be configured to adjust operations of other propulsion-generating vehicles to compensate for the reduced TE of the propulsion-generating vehicle 104. More specifically, the propulsion-generating vehicle 105 may be instructed to increase its TE so that the system TE approaches a system effort limit or is approximately equal to a system effort limit that is prescribed by regulation. In particular embodiments, the vehicle system 100 may selectively control individual traction-providing elements (e.g., individual axle wheelsets of a single vehicle) to control the system TE.

In other embodiments, the vehicle system 100 may determine that the vehicle consist 110 is incapable of maintaining a designated consist TE without an unwanted effect occurring (e.g., slippage, damage to the propulsion-generating vehicles of the vehicle consist 110, inefficient use of fuel, etc.). In such embodiments, the vehicle consist 110 may communicate with the vehicle consist 111 and/or the vehicle system 100 may determine that the consist TE of the vehicle consist 111 should increase to compensate for the reduced consist TE of the vehicle consist 110. In response to this determination, the propulsion-generating vehicles of the vehicle consist 111 may communicate with each other to increase the consist TE thereby increasing the system TE of the vehicle system 100.

In some cases, when vehicles systems are configured the propulsion-generating vehicles may have different communication capabilities. For example, when the locomotives of a train are coupled together one or more of the locomotives may be configured to communicate the principal locomotive as described herein and one or more locomotives may not be configured to communicate with the principal locomotive (hereinafter referred to as legacy locomotives). More specifically, a legacy locomotive may be coupled to the train and capable of providing TE or BE for the train, but may not be able to communicate directly with the principal locomotive. In such embodiments, the principal locomotive is not able to communicate directly with the legacy locomotive to determine the TEs or BEs of the legacy locomotive or to instruct the legacy locomotive to adjust TEs or BEs.

Accordingly, embodiments described herein may be configured to estimate or predict the TE or BE of the legacy locomotive without communicating directly with the legacy locomotive. The BE or TE of the legacy locomotive may then be inserted into the algorithm for controlling the BE or TE of the other locomotives and the train as a whole. Various manners of estimating or predicting the TE or BE of the legacy locomotive may be used. For example, the principal locomotive may use historical data to determine that the legacy locomotive is providing an insufficient amount of TE. As another example, one or more speed sensors may be coupled to the legacy locomotive and communicate directly with the principal locomotive. Sensors may also be attached to the mechanical couples that extend between the legacy locomotive and adjacent vehicles. Such sensors may communicate data with the principal locomotive that relates to stresses sustained by the mechanical couplers.

Also shown in FIG. 1, the vehicle system 100 may communicate with a network or monitoring system 116 that can be disposed off-board (e.g., outside) of the vehicle system 100. For example, the network system 116 may be disposed at a central dispatch office for a railroad company. The network system 116 can generate and communicate various operating plans and/or communicate information regarding route conditions. The network system 116 can include a wireless antenna 118 (and associated transceiving equipment), such as a radio frequency (RF) or cellular antenna, that wirelessly transmits signals to the vehicle system 100. The vehicle system 100 may also include a wireless antenna 120 (and associated transceiving equipment). The network system 116 may also receive information from the vehicle system 100 to analyze or pass along to a central data store or analysis center.

In some embodiments, the network system 116 may communicate data regarding the route conditions of different segments of the route 102. For example, the network system 116 may identify an upcoming mile marker, post, landmark, or location along the route 102 in which the route condition changes. The vehicle system 100 may then use the data provided by the network system 116 in controlling the different TEs of the vehicle system 100.

Figure 2:
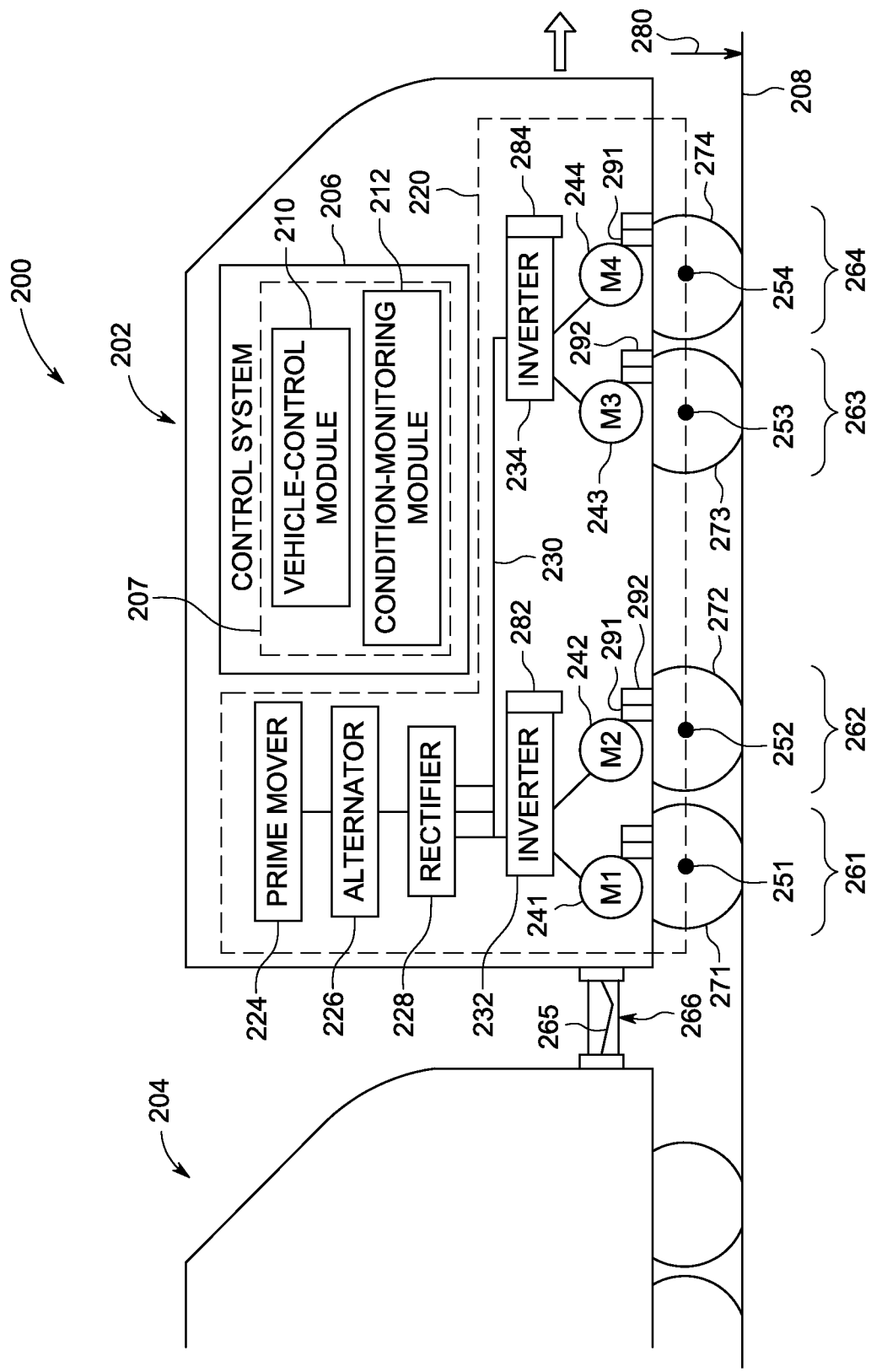
FIG. 2 is a schematic diagram of two propulsion-generating vehicles in accordance with one embodiment that are linked to each other.

FIG. 2 is a schematic diagram of a vehicle system 200 that includes a plurality of propulsion-generating vehicles 202, 204. The vehicle system 200 may be similar or identical to the vehicle system 100 (FIG. 1). The propulsion-generating vehicles 202, 204 may constitute or be part of a vehicle consist that may or may not be coupled with other vehicle consist(s) (not shown) in the vehicle system 200. In FIG. 2, the propulsion-generating vehicle 202 is a principal or lead propulsion-generating vehicle and the propulsion-generating vehicle 204 is a remote propulsion-generating vehicle that is controlled by the propulsion-generating vehicle 202. To this end, the propulsion-generating vehicle 202 includes a control system 206 having an effort-monitoring system (or sub-system) 207 that is configured to control operation of the propulsion-generating vehicles 202, 204. However, in other embodiments, the propulsion-generating vehicle 204 may be the principal vehicle and may include an effort-monitoring system that is configured to control operation of the propulsion-generating vehicle 202. Alternatively, the control system 206 or the effort-monitoring system 207 may be distributed between the propulsion-generating vehicles 202, 204. For embodiments that include multiple vehicle consists, the effort-monitoring system 207 may be configured to control operation of other vehicle consists.

The effort-monitoring system 207 may have a plurality of modules including a vehicle-control module 210, an analysis module 212, and adhesion-control modules 282, 284. The effort-monitoring system 207 and the modules 210, 212, 282, 284 are configured to communicate signals to and receive signals from different components, assemblies, and sub-systems for controlling operation of the vehicle system 200. The effort-monitoring system 207 may be or include one or more controllers, processors, or other logic-based devices that perform operations based on one or more sets of instructions (e.g., software). In some cases, the different modules of the effort-monitoring system 207 are part of the same logic-based device or, alternatively, are distributed within multiple logic-based devices. The instructions on which the effort-monitoring system 207 operates may be stored on a tangible and non-transitory (e.g., not a transient signal) computer readable storage medium, such as a memory. The memory may include one or more computer hard drives, flash drives, RAM, ROM, EEPROM, and the like. Alternatively, one or more of the sets of instructions that direct operations of the effort-monitoring system 207 may be hard-wired into the logic of the effort-monitoring system 207, such as by being hard-wired logic formed in the hardware of the effort-monitoring system 207.

The vehicle-control and analysis modules 210, 212 are shown as being included in or as being part of a common structure of the effort-monitoring system 207. However, the modules 210, 212 are not required to be part of the same structure and, instead, may be separated from other portions of the effort-monitoring system 207 and/or each other. Likewise, the adhesion-control modules 282, 284 may be separate from the other modules, as shown, or may be part of the same structure or device. In some embodiments, one or more of the modules may be located off-board the propulsion-generating vehicle 202.

The vehicle-control module 210 is configured to control tractive and/or braking operations of the propulsion-generating vehicle 202. To this end, the vehicle-control module 210 is configured to communicate with a propulsion system 220 and a braking system (not shown). The vehicle-control module 210 may instruct (e.g., communicate signals to one or more components of the propulsion system 220) to increase or decrease power, tractive effort, etc. For example, the instructions may be in accordance with one or more operating plans that designate tractive operations (e.g., notch or throttle settings) and braking operations to be implemented by the vehicle system 200. The operating plan may include instructions for controlling tractive and/or braking efforts of a vehicle system for only a portion of the route or for the entire route. The instructions may be expressed as a function of time and/or distance of a trip along a route. In one embodiment, the vehicle-control module 210 may autonomously control operations of the propulsion-generating vehicle 202 according to the operating plan.

In the illustrated embodiment, the propulsion-generating vehicle 202 is a diesel-electric locomotive that includes the propulsion system 220. The propulsion system 220 includes a variable speed prime mover or engine 224 that is mechanically coupled to a rotor of a dynamo electric machine. In the illustrated embodiment, the dynamo electric machine is an alternator 226 and, in particular, a 3-phase alternating current (AC) synchronous alternator. The 3-phase voltages generated by the alternator 226 are supplied to input terminals of a power rectifier bridge 228. The rectifier bridge 228 may transform or modify the AC power from the alternator 226 into direct current (DC) power. The power rectifier bridge 228 has output terminals that supply the DC power to a DC link or bus 230. Although the propulsion system 220 is described as being an AC-type propulsion system that is powered by diesel, it is understood that embodiments set forth herein may also be implemented with DC-type propulsion systems and/or propulsion systems that are at least partially powered by electricity (e.g., batteries, catenary system, and the like).

As shown, the DC link 230 is electrically connected to inverters 232, 234. The inverters 232, 234 are configured to convert (e.g., invert) the DC power into AC power at a designated frequency for powering traction motors 241-244. The inverters 232, 234 may employ high power gate turn-off devices which switch in and out of conduction in response to gating signals from the effort-monitoring system 207 (or the vehicle-control module 210) so as to invert the DC voltage on the DC link 230 to a controlled frequency AC voltage.

Although not shown, the DC link 230 may also be electrically coupled to other components, such as a conditioning device and/or an auxiliary sub-system. The conditioning device may be configured to filter out unwanted frequencies and/or regulate the current of the DC link 230. The auxiliary sub-system may be operably coupled to one or more non-tractive components (e.g., compressors, fans or blowers, on-board air conditioners, radiators).

The motors 241, 242 are electrically connected to and powered by the inverter 232, and the motors 243, 244 are electrically connected to and powered by the inverter 234. The motors 241, 242 are electrically parallel to each other, and the motors 243, 244 are electrically parallel to each other. In some embodiments, the motors 241-244 are adjustable speed AC traction motors. Also shown, the motors 241-244 are operably coupled to axles 251-254, respectively, that are each coupled to wheels 271-274. The motors 241-244, the axles 251-254, and the wheels 271-274 may constitute respective axle wheelsets 261-264. For example, the motor 241, the axle 251, and a pair of wheels 271 may constitute the wheelset 261, which is configured to generate a TE for propelling the propulsion-generating vehicle 202 and, hence, the vehicle system 200. Each of the axle wheelsets 261-264 may be selectively controlled by the vehicle-control module 210 and the effort-monitoring system 207 to provide a designated TE (hereinafter referred to as the "axle TE"). Under some circumstances, the wheelsets of a single vehicle may provide different axle TEs.

Although not shown, the propulsion-generating vehicle 204 may have a similar or identical propulsion system, although the propulsion system (not shown) of the propulsion-generating vehicle 204 may be controlled by the effort-monitoring system 207. The propulsion-generating vehicles 202, 204 may be communicatively coupled to each other through a communication cable 265. The cable 265 may include, for example, an Ethernet over multiple units (eMU) cable. The cable 265 may enable the propulsion-generating vehicles 202, 204 to communicate with each other regarding various operations of the vehicle system 200. However, it is noted that embodiments may utilize other methods of communicating, such as other wired systems, wired distributed power (DP) links, wireless communication (e.g., radio communication), and the like.

In the illustrated embodiment, the propulsion-generating vehicles 202, 204 are adjacent to each other and directly connected by a mechanical coupler 266. The mechanical coupler 266 may allow some tolerance or slack such that the propulsion-generating vehicles 202, 204 are permitted to move a limited distance toward each other or away from each other. In alternative embodiments, the propulsion-generating vehicles 202, 204 are not adjacent to each other. Instead, the propulsion-generating vehicles 202, 204 may be indirectly coupled to one another via other vehicles, which may be propulsion-generating or non-powered vehicles. For example, the propulsion-generating vehicle 202 may lead the vehicle system 200 as shown in FIG. 2 and the propulsion-generating vehicle 204 may be located at a position that is about ⅔ a length of the vehicle system 200 away from the propulsion-generating vehicle 204.

The propulsion-generating vehicles 202, 204 of FIG. 2 are only particular examples of locomotives that may be used with embodiments set forth herein. It is understand that various modifications may be made to the vehicle system 200 and that other types of locomotives may be used. For example, it may be desirable to provide an inverter for each motor or to couple additional motors to a single inverter. As such, it is understood that the inventive subject matter described herein is not limited to 4-axle systems and is equally applicable to other systems, for example, such as 6-axle locomotives with six inverters each connected for powering a respective one of six traction motors each connected to respective ones of the six axles. Furthermore, as described above, the inventive subject matter is not limited to rail applications, but may be used with other types of powered vehicle systems that include a plurality of discrete vehicles that are coupled to one another.

The vehicle system 200 travels along a route 208, which includes parallel rails of a track. Each of the propulsion-generating vehicles 202, 204 facilitates driving the vehicle system 200 using the wheelsets of the respective vehicle. For example, the traction motors 241-244 deliver torque to the wheels 271-274, which exert tangential force (e.g., tractive effort) along the route 208, thereby propelling the vehicle system 200 along the route 208. The TE developed at each wheel of the propulsion-generating vehicle 202 is proportional to a normal force 280 acting on the respective wheel. The axle TE of a single axle wheelset is approximately equal to the friction coefficient multiplied by the normal force 280 acting on the respective wheelset. The total TE or TE provided by the propulsion-generating vehicle 202 is the sum of each of the axle TEs.

For a dynamic braking mode, the traction motors 241-244 are reconfigured (via power switching devices (not shown)) so that the traction motors 241-244 operate as generators. So configured, the traction motors 241-244 generate electric energy which has the effect of slowing the propulsion-generating vehicle 202. In some cases, energy generated in a dynamic braking mode may be transferred to resistance grids (not shown) that are coupled to the propulsion-generating vehicle 202. The dynamic braking energy may be converted to heat and dissipated from the propulsion-generating vehicle 202 through the grids. In other embodiments, the dynamic braking energy may be stored (e.g., batteries) by the propulsion-generating vehicle 202.

As shown in FIG. 2, the adhesion-control modules 282, 284 of the effort-monitoring system 207 may be incorporated with the inverters 232, 234, respectively. In other embodiments, the adhesion-control modules 282, 284 may be with the same structure for the modules 210, 212. Alternatively, each of the motors 241-244 may include a respective adhesion-control module.

The adhesion-control modules 282, 284 are configured to monitor one or more operating conditions that have a relation to TE and/or BE. Data obtained regarding the operating conditions may be used to calculate TE, BE and/or used to control an amount of TE or BE applied. For example, the adhesion-control modules 282, 284 may obtain measurements from the wheelsets 261-264 that may be used to calculate TEs for the wheelsets 261-264. As shown, each of the adhesion-control modules 282, 284 may be communicatively coupled to sensors 291, 292. The sensors 291, 292 may be configured to detect at least one of rotation speed, torque, torsional vibrations, vehicle speed (e.g., ground speed), wheel strain, axle strain, dog-bone strain, or motor speed, which may be used to calculate TE or BE or to adjust a level of TE or BE.

In the illustrated embodiment, the sensors 291, 292 are rotation-speed and vehicle-speed sensors, respectively. The rotation-speed sensors 291 communicate data (e.g., in the form of signals) that is representative of a rotational speed of a corresponding wheelset. For example, the rotation-speed sensors 291 may measure how fast a wheel, axle, or motor shaft of the corresponding wheelset is rotating. In particular embodiments, the rotation-speed sensors 291 detect a voltage or current signal of the electrical power supplied to the respective motor that is representative of the wheel speed. The vehicle-speed sensors 292 communicate data that is representative of how fast the propulsion-generating vehicle 202 is moving along the route 208. By way of example, the vehicle-speed sensors 292 can include or use location data generated by a location determining system, such as a Global Positioning System (GPS) receiver, in order to generate the data representative of the speed at which the propulsion-generating vehicle 202 moves along the route 208. The data representative of the wheel speed and the vehicle speed can be communicated to a corresponding adhesion-control module.

As another example, the adhesion-control modules 282, 284 may monitor or obtain data relating to wheel creep to improve or optimize the wheel creep during operation of the vehicle system 200. More specifically, a designated tractive effort or braking effort may be obtained if each of the wheelsets 261-264 of the propulsion-generating vehicle 202 is rotating at such an angular velocity that its actual peripheral speed (e.g., wheel speed) is slightly higher (in case of motoring) or slightly lower (in case of braking) than the actual speed of the vehicle. The difference between the linear speed at which the vehicle is traveling (referred to as vehicle speed) and wheel speed is referred to as wheel creep. There is usually a relatively low limit on the value of wheel creep at which peak tractive effort or braking effort is realized.

This value, commonly known as optimum creep, is a variable that depends on the vehicle speed and the surface conditions of the vehicle system 200 and the route 208. The optimum creep correlates to a peak value of an applicable wheel-rail adhesion-creep curve. Operation of any or all wheelsets away from the optimum creep, such as too large of a creep value, may cause a reduction or loss of wheel-to-surface adhesion. If the wheel-to-surface adhesion is reduced or lost, some or all the vehicle wheels may slip excessively. This is often undesirable as slippage can cause accelerated wheel wear, rail damage, high mechanical stresses in the drive components of the propulsion system, and an undesirable decrease of tractive (or braking) effort.

The wheel creep, the wheel speed, the vehicle speed, or other data from each of the wheelsets 261-264 may be communicated to the analysis module 212. The analysis module 212 may analyze the data to determine the TE or BE of the propulsion-generating vehicle 202 and/or if an adverse route condition exists. The TE or BE may be calculated by summing the individual axle TEs or BEs. An adverse route condition may exist, for instance, if the propulsion-generating vehicle is incapable of operating at a designated TE or a designated BE without excessive slippage. For example, when the propulsion-generating vehicle 202 encounters a portion of the route 208 that has a reduced friction coefficient, such as the route segment B shown in FIG. 1, a TE above a certain value may cause an excessive amount of slippage. Under such circumstances, the effort-monitoring system 207 may instruct the propulsion system 220 to decrease the TE until, for example, the wheelsets 261-264 are no longer slipping excessively and/or an optimum creep is obtained. The instructions may include specific instructions for selectively controlling the wheelsets 261-264 such that the wheelsets 261-264 generate different TEs or, alternatively, the instructions may include common instructions for the wheelsets 261-264 such that the wheelsets 261-264 generate a common TE.

In some cases, however, the decreased TE may reduce the system TE (or consist BE) to be less than what is legally permitted by regulation (e.g., less than the system or consist effort limit). For example, if the regulation prescribes a designated system TE (or consist TE), the decreased TE may cause the system TE (or consist TE) to be less than what is legally permitted. Accordingly, embodiments described herein are configured to identify that at least one of the TEs is insufficient such that the system TE (or consist TE) is less than what is permitted by the corresponding regulation. In response to identifying the TE that is insufficient, embodiments may instruct other propulsion-generating vehicles to increase the TE.

Likewise, a decreased BE may reduce the system BE (or consist BE) to be less than what is legally permitted by regulation. Thus, embodiments described herein are configured to identify that at least one of the BEs is insufficient such that the system BE (or consist BE) is less than what is permitted by the corresponding regulation. In response to identifying the BE that is insufficient, embodiments may instruct other propulsion-generating vehicles to increase the BE.

As one specific example, a regulation may prescribe that a system TE for the vehicle system 200 may be at most 380 klbs. In many instances, it is desirable to operate the vehicle system 200 such that the system TE is approximately equal to the system effort limit. With ideal or approximately ideal route conditions, it may be desirable to operate the propulsion-generating vehicles 202, 204 at an approximately equal TE. In this example, each of the propulsion-generating vehicles 202, 204 may have a common TE of 190 klbs when the route conditions are not adverse.

However, when the propulsion-generating vehicle 202 encounters a route segment that has unwanted matter (e.g., lubricants, dirt, leaves, wear debris, etc.), the traction between the wheels and rails is reduced. In particular, the unwanted matter effectively reduces the friction coefficient. With the reduced friction coefficient, the common TE (e.g., 190 klbs) may overshoot the optimum creep and cause excessive slippage of the wheels 271-274 of the propulsion-generating vehicle 202. To reduce the slippage, the effort-monitoring system 207 may decrease the TE of the propulsion-generating vehicle 202 by instructing the wheelsets 261-264 to decrease the respective TE. When the propulsion-generating vehicle 202 decreases its TE, the system TE of the vehicle system 200 is also decreased.

Accordingly, the effort-monitoring system 207 may determine that the TE of the propulsion-generating vehicle 202 is insufficient for causing the combined effort to reach the system effort limit for the system TE. In response to determining that the TE of the propulsion-generating vehicle 202 is insufficient, the effort-monitoring system 207 may instruct the propulsion-generating vehicle 204 to increase its respective TE so that the system TE is approximately equal to the system effort limit. In the above example, the effort-monitoring system 207 may instruct the propulsion-generating vehicle 204 to increase its respective TE so that the system TE is closer to the system effort limit.

Figure 3:
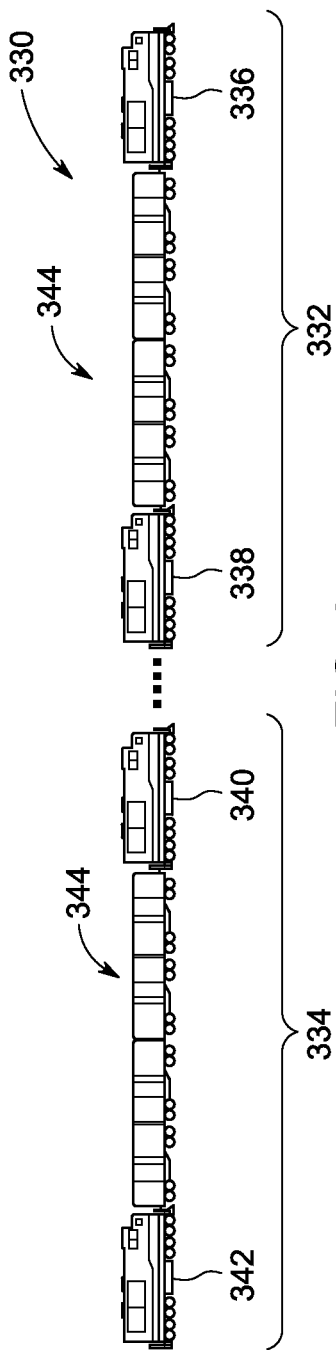
FIG. 3 is schematic diagram of a vehicle system in accordance with one embodiment.
Figure 4:
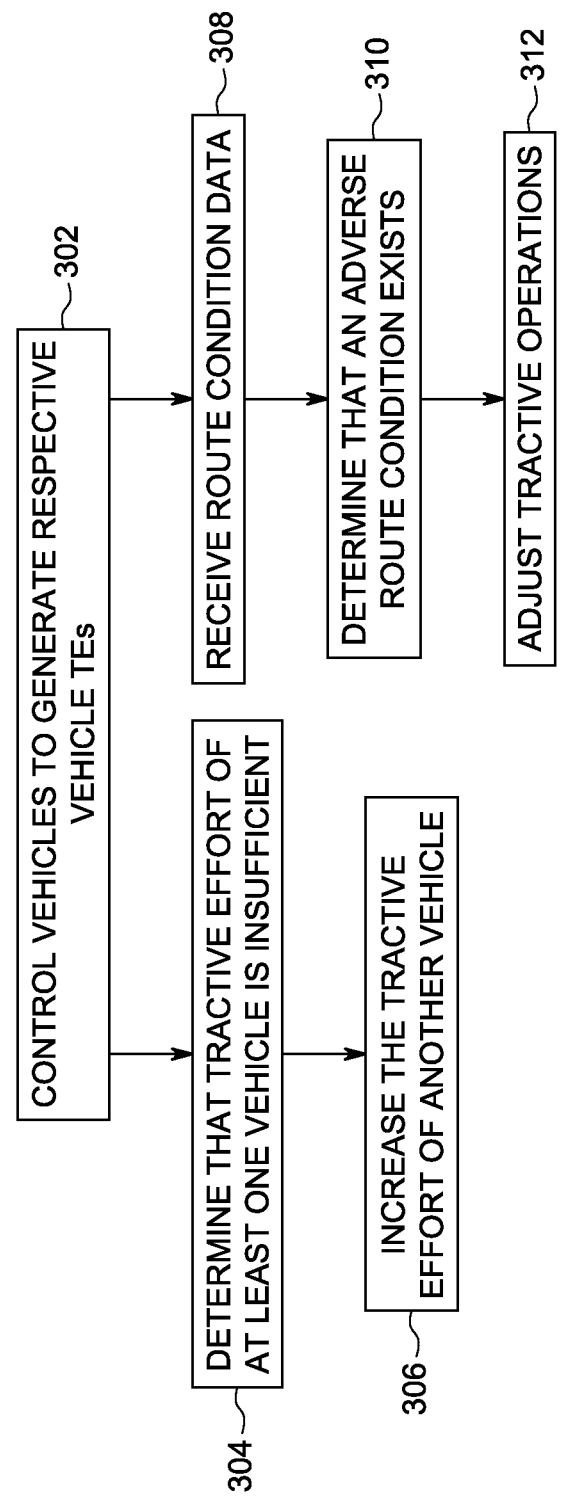
FIG. 4 is a flowchart illustrating a method of controlling tractive efforts or braking efforts of the vehicle system shown in FIG. 3.

FIG. 3 shows a vehicle system 330 including first and second vehicle consists 332, 334 having discrete vehicles that are linked directly or indirectly to each other, and FIG. 4 is a flowchart illustrating a method 300 of controlling tractive efforts of the vehicle system 330. Although the following is with specific reference to controlling TE, it is understood that the description may be similarly applied to controlling BE.

The vehicle consist 332 includes first and second propulsion-generating vehicles 336, 338, and the vehicle consist 334 includes first and second propulsion-generating vehicles 340, 342. The first propulsion-generating vehicles 336, 340 may be principal vehicles that control operations of the vehicle consists 332, 334, respectively. Each of the vehicle consists 332, 334 includes a plurality of non-powered vehicles 344. The method 300 may be implemented by an effort-monitoring system of one of the first propulsion-generating vehicles 336, 340, which may be similar to the effort-monitoring system 207 (FIG. 2) described herein.

The method 300 (FIG. 4) includes controlling (at 302) the first and second propulsion-generating vehicles 336, 338 of the vehicle consist 332 and the first and second propulsion-generating vehicles 340, 342 of the vehicle consist 334 to generate respective TEs to propel the vehicle system 330 along a designated route. The TEs may collectively provide a system TE that represents a combined effort of the propulsion-generating vehicles 336, 338, 340, 342 for propelling the vehicle system 330 along the route. As described herein, the system TE may be prescribed by regulation to be at most a designated effort limit or may be prescribed by an operating plan. For instance, the designated effort limit may be at most 180 klbs (or 800 kilo-newtons) per propulsion-generating vehicle of the vehicle system 330. As such, the system effort limit for the vehicle system 330 may be 720 klbs (or 3200 kilo-newtons). Alternatively, the regulation may be directed toward a consist TE. As such, the system effort limit for the vehicle consists 332, 334 may be 360 klbs (or 1600 kilo-newtons).

Controlling (at 302) the TEs may include operating the vehicle consists 332, 334 in accordance with a designated operating plan that include instructions for tractive and braking operations of the vehicle consists 332, 334 and/or the vehicle system 330 as a whole. Controlling (at 302) may also include monitoring designated operating conditions, such as TE, as the vehicle system 330 traverses a designated route. In particular embodiments, controlling (at 302) may include selectively controlling individual axle wheelsets of the vehicles 336, 338, 340, and 342. The wheelsets may be similar or identical to the wheelsets 261-264 (FIG. 2).

The method 300 may also include determining (at 304) that one TE is insufficient for causing the combined effort to reach a designated system TE or consist TE. For example, the propulsion-generating vehicle 336 may include an effort-monitoring system that monitors the TEs generated by the propulsion-generating vehicle 336 and the propulsion-generating vehicle 338. The effort-monitoring system may include sensors that obtain measurements (e.g., rotation speed, vehicle speed, wheel creep, and the like) that may be used to calculate TE of the propulsion-generating vehicles 336, 338. Based on these calculations, the effort-monitoring system may determine that a TE is insufficient for causing the combined effort to reach a system TE that is approximately equal to the system effort limit. As described above, the propulsion-generating vehicle 336 may have an insufficient TE due to a change in route condition that reduces the friction coefficient. The trailing vehicles 338, 340, 342 may not experience the same change in route conditions due to the effect that the vehicle 336 has on the surfaces of the route. For instance, the vehicle 336 may remove unwanted matter from the route that causes the decrease in traction.

In response to determining that one of the TEs is insufficient, the method 300 includes increasing (at 306) the TE in at least one of the trailing vehicles 338, 340, 342. The total increase in TE provided by the trailing vehicles 338, 340, 342 may be based on the amount of TE that the propulsion-generating vehicle 336 decreased. For example, if the TE of the propulsion-generating vehicle 336 decreased 30 klbs, the propulsion-generating vehicle 338 may be increased by as much as 30 klbs. In other embodiments, at least two of the trailing vehicles 338, 340, 342 may have TEs increased so that the total increase is 30 klbs. For instance, the TEs of the trailing vehicles may be increased 5, 10, and 15 klbs, respectively.

Alternatively or in addition to, the method 300 may include receiving (at 308) route condition data that is representative of a route condition along the route. The route condition data may be obtained off-board the vehicle system 330. For instance, a monitoring station or another vehicle system may transmit data to the vehicle system 330 regarding conditions of approaching route segments. The method 300 may also include determining (at 310) that an adverse route condition exists based on the route condition data. For example, if the transmitted data includes friction coefficients of upcoming route segments, the effort-monitoring system of the vehicle 336 may determine whether the present TE will cause slippage when the vehicle system encounters a new route segment.

The method 300 may also include adjusting (at 312), in response to determining that an adverse route condition exists, tractive operations of the vehicle system 330. The tractive operations may be adjusted so that the TEs are different and the system TE is increased. The adjusting (at 302) may include decreasing the TE of the vehicle 336 and increasing the TE of one or more of the trailing vehicles.

Figure 5:
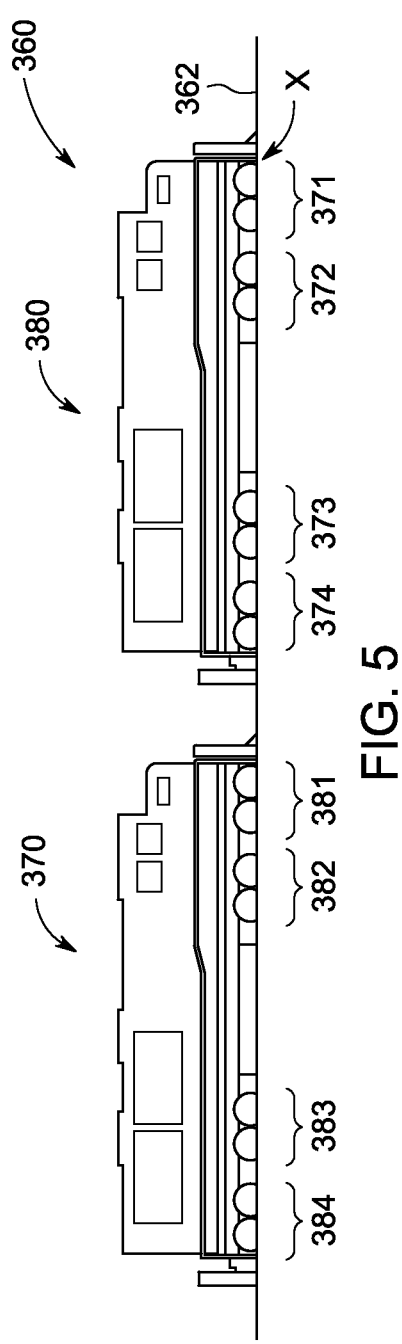
FIG. 5 is schematic diagram of a vehicle system in accordance with one embodiment.
Figure 6:
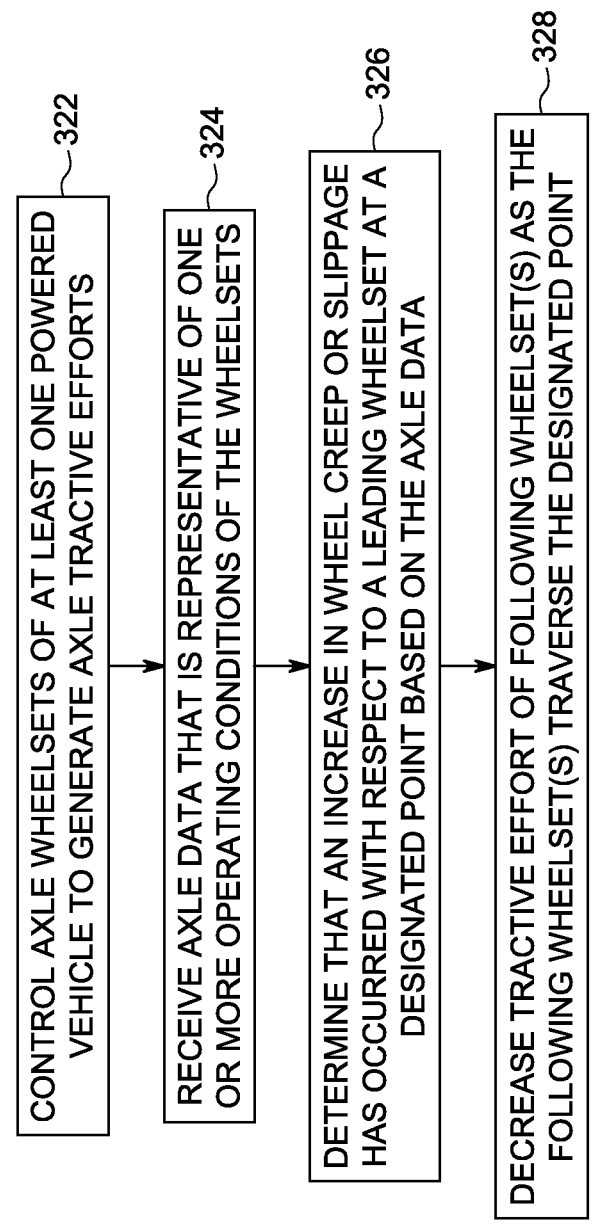
FIG. 6 is a flowchart illustrating a method of controlling tractive efforts or braking efforts of the vehicle system shown in FIG. 5.

FIG. 5 shows a vehicle system 360 that includes discrete first and second propulsion-generating vehicles 370, 380, and FIG. 6 is a flowchart illustrating a method 320 of controlling TE of the vehicle system 360. Although the method 320 is described with specific reference to controlling TE, the method 320 may also be suitable for controlling BE. The method 320 may be implemented by an effort-monitoring system of one of the propulsion-generating vehicles 370, 380, which may be similar to the effort-monitoring system 207 (FIG. 2) described herein. The vehicle system 360 may be a vehicle consist that is coupled to other vehicle consists (not shown) and may be similar to the vehicle consists 332, 334 of FIG. 3. As shown, the propulsion-generating vehicle 370 includes wheelsets 371-374 that are spaced apart from each other along a length of the propulsion-generating vehicle 370, and the propulsion-generating vehicle 380 includes wheelsets 381-384 that are spaced apart from each other along a length of the propulsion-generating vehicle 380.

The method 320 includes controlling (at 322) the wheelsets 371-374 and 381-384 to generate respective axle TEs for propelling the vehicle system 360 along a designated route 362. Controlling (at 322) may include instructing the wheelsets 371-374, 381-384 in accordance with an operating plan. At 324, axle data may be received from the wheelsets 371-374, 381-384 that is representative of one or more operating conditions of the wheelset. For example, the vehicle system 360 may monitor one or more operating conditions (e.g., wheel speed, wheel creep) of the respective wheelsets by continuously receiving data from the wheelsets. In some embodiments, the wheelsets are configured to automatically adjust operation to maintain a designated wheel speed or wheel creep. The method 320 may also include determining (at 326) that an increase in wheel creep or slippage has occurred with respect to one of the wheelsets.

In some embodiments, the vehicle system 360 may determine (at 326) based on the axle data that an increase in wheel creep or slippage was experienced by the leading wheelset 371 at a designated point X along a route 362. For example, the wheelset 371 may be providing a tractive effort of 45 klbs. As the wheelset 371 traverses the designated point X, one or more sensors operably coupled to the wheelset 371 may detect a substantial change in wheel speed. An adhesion-control module (or traction control device) coupled to the wheelset 371 may identify the change as slippage. Accordingly, the adhesion-control module may communicate to the effort-monitoring system of the vehicle system 360 or to other wheelsets 371 that the designated point X is associated with a change in wheel speed.

At 328, the axle TE of at least one of the wheelsets 372-374 and 381-384 may be decreased before the corresponding wheelset(s) is at the designated point X. The axle TE(s) may be decreased to reduce a likelihood of slippage or change in wheel creep occurring with respect to the corresponding wheelset. In some embodiments, the vehicle system 360 may decrease the axle TE of a trailing wheelset after a designated travel time so that the trailing wheelset has a reduced TE as the trailing wheelset traverses the designated point X. The designated travel time may be based on a speed of the vehicle system (e.g., vehicle speed), lengths of the discrete vehicles between the vehicles of the wheelsets, position of the wheelsets within the respective vehicle, and a tolerance of mechanical couplers that join the discrete vehicles.

Although the methods 300 (FIG. 4) and 320 (FIG. 6) are described separately, the methods 300, 320 may be combined in one or more embodiments. For example, the axle wheelsets of different propulsion-generating vehicles may be individually controlled to maintain a designated system TE that approaches or is approximately equal to a system effort limit prescribed by regulation. Concurrently, the wheelsets of the different propulsion-generating vehicles may be individually controlled to reduce the number of slipping events.

In some embodiments, the method 320 may also include increasing the axle TE of a second trailing wheelset when the axle TE of a first trailing wheelset is decreased. For example, as the wheelset 374 traverses the designated point X, the axle TE of the wheelset 374 may be decreased and the axle TE of at least one of the wheelsets 381-384 may be increased to compensate for the reduced TE. Accordingly, the vehicle system 360 may maintain a designated system TE while also reducing slipping events that may reduce the operational efficiency of the vehicle system 360.

As used herein, the terms "system" and "module" include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. The modules shown in the attached figures may represent the hardware that operates based on software or hardwired instructions, the software that directs hardware to perform the operations, or a combination thereof.

In one embodiment, a system is provided that includes an effort-monitoring system configured to control tractive efforts (TEs) individually produced by plural propulsion-generating vehicles in a vehicle system to propel the vehicle system along a route. The effort-monitoring system is configured to control each of the propulsion-generating vehicles to provide a respective prescribed TE. The vehicle system operates at a system TE when each of the propulsion-generating vehicles is providing the respective prescribed TE. The prescribed TEs are determined by at least one of an operating plan of the vehicle system or a first regulation that limits TE or ground speed of the vehicle system. In response to determining that a first vehicle of the plural propulsion-generating vehicles is providing a reduced TE that is less than the prescribed TE of the first vehicle, the effort-monitoring system is configured to control a second vehicle of the plural propulsion-generating vehicles to exceed the prescribed TE of the second vehicle so that the vehicle system is operating at or below the system TE.

In one aspect, the effort-monitoring system is configured to determine that the first vehicle of the plural propulsion-generating vehicles is incapable of achieving the prescribed TE due to at least one of a route condition along the route or an impaired wheelset of the first vehicle of the plural propulsion-generating vehicles.

In one aspect, the effort-monitoring system is configured to receive route condition data that is representative of a route condition along the route and identify that an adverse route condition exists based on the route condition data. The effort-monitoring system is configured to, in response to identifying that the adverse route condition exists, adjust the TEs of the propulsion-generating vehicles so that the vehicle system is at or below the system TE.

In one aspect, the respective prescribed TEs are configured to maximize the ground speed of the vehicle system.

In one aspect, the effort-monitoring system is configured to control braking efforts (BEs) individually produced by the propulsion-generating vehicles in the vehicle system. The effort-monitoring system is configured to control each of the propulsion-generating vehicles to provide a respective prescribed BE during a braking operation. The vehicle system has a system BE when each of the propulsion-generating vehicles provides the respective prescribed BE during the braking operation. The respective prescribed BEs are determined by at least one of the operating plan of the vehicle system or a second regulation that limits BE of the vehicle system. In response to determining that one of the propulsion-generating vehicles is providing a reduced BE that is less than the respective prescribed BE. The effort-monitoring system is configured to control at least one of the other propulsion-generating vehicles to exceed the respective prescribed BE so that the vehicle system is at or below the system BE during the braking operation.

In one aspect, the propulsion-generating vehicle operating at the reduced TE is a leading vehicle and the at least one propulsion-generating vehicle includes plural trailing vehicles. The effort-monitoring system is configured to control the trailing vehicles to exceed the respective prescribed TEs so that the vehicle system is operating at or proximate to the system TE.

In one aspect, the vehicle system includes a first vehicle consist having the propulsion-generating vehicles and a second vehicle consist that is linked directly or indirectly to the first vehicle consist. Optionally, the effort-monitoring system is configured to control TEs individually produced by plural propulsion-generating vehicles of the second vehicle consist to propel the vehicle system along the route.

In one aspect, each of the propulsion-generating vehicles includes axle wheelsets that collectively provide the TE for the respective propulsion-generating vehicle. Each of the wheelsets generates an axle TE, wherein the effort-monitoring system is configured to obtain axle data that represents the axle TEs.

In one aspect, the wheelsets of the propulsion-generating vehicles include a leading wheelset and plural trailing wheelsets that follow the leading wheelset. The effort-monitoring system is configured to detect slippage of the leading wheelset at a designated point of the route. The effort-monitoring system configured to decrease the axle TE of at least one of the trailing wheelsets to reduce a likelihood of slippage at the designated point.

In one embodiment, a method of operating a vehicle system is provided. The method includes controlling plural propulsion-generating vehicles to individually produce a prescribed tractive effort (TE) during a tractive operation. The vehicle system operates at a system TE when each of the propulsion-generating vehicles is providing the respective prescribed TE. The prescribed TEs are determined by at least one of an operating plan of the vehicle system or a first regulation that limits TE or ground speed of the vehicle system. The method also includes controlling, in response to determining that one of the propulsion-generating vehicles is providing a reduced TE that is less than the respective prescribed TE, at least one of the other propulsion-generating vehicles to exceed the respective prescribed TE so that the vehicle system is operating at or below the system TE.

In one aspect, the method also includes determining that the propulsion-generating vehicle providing the reduced TE is incapable of achieving the prescribed TE due to at least one of a route condition along the route or an impaired wheelset of the propulsion-generating vehicle providing the reduced TE.

In one aspect, the method also includes receiving route condition data that is representative of a route condition along the route and identifying an adverse route condition based on the route condition data. In response to identifying the adverse route condition, the method may include adjusting the TEs of the propulsion-generating vehicles so that the vehicle system is at or below the system TE.

In one aspect, the method also includes controlling braking efforts (BEs) individually produced by the propulsion-generating vehicles to provide a respective prescribed BE during a braking operation. The vehicle system has a system BE when each of the propulsion-generating vehicles provides the respective prescribed BE during the braking operation, wherein the respective prescribed BEs are determined by at least one of the operating plan of the vehicle system or a second regulation that limits BE of the vehicle system. The method also includes controlling, in response to determining that one of the propulsion-generating vehicles is providing a reduced BE that is less than the respective prescribed BE, at least one of the other propulsion-generating vehicles to exceed the respective prescribed BE so that the vehicle system is at or below the system BE during the braking operation.

In one embodiment, a system is provided that includes an effort-monitoring system configured to control vehicle tractive efforts (TEs) individually produced by plural propulsion-generating vehicles in a vehicle system to propel the vehicle system along a route. The TE that is individually produced by each of the propulsion-generating vehicles is associated with a previously defined limit that prohibited generation of the TE in excess of the previously defined limit. The effort-monitoring system is configured to allocate a system TE produced by the propulsion-generating vehicles in the vehicle system among the propulsion-generating vehicles such that the TE produced by at least one of the propulsion-generating vehicles exceeds the previously defined limit while the system TE remains at or below a system effort limit.

In one aspect, the system effort limit is based on the previously defined limit and a number of the propulsion-generating vehicles in the vehicle system.

In another aspect, the effort-monitoring system is configured to receive route condition data that is representative of a route condition along the route and identify that an adverse route condition exists based on the route condition data. The effort-monitoring system is configured to, in response to identifying that the adverse route condition exists, adjust tractive operations so that the TEs are different and so that the system TE is approximately equal to the system effort limit.

In another aspect, the propulsion-generating vehicles include a leading vehicle and a trailing vehicle that follows the leading vehicle. The effort-monitoring system is configured to control tractive operations of the vehicle system so that the TE of the trailing vehicle exceeds the previously defined limit when the TE of the leading vehicle is less than the previously defined limit.

In another aspect, the trailing vehicle is a first trailing vehicle and the propulsion-generating vehicles include a second trailing vehicle, the effort-monitoring system configured to control tractive operations of the vehicle system so that the TE of the second trailing vehicle is greater than the TE of the leading vehicle.

In another aspect, the vehicle system includes a first vehicle consist having the propulsion-generating vehicles and a second vehicle consist that is linked directly or indirectly to the first vehicle consist. The second vehicle consist has plural propulsion-generating vehicles.

In another aspect, each of the propulsion-generating vehicles includes axle wheelsets that collectively provide the TE for the respective vehicle. Each of the wheelsets generates an axle TE, wherein the effort-monitoring system is configured to obtain axle data that represents the axle TEs. For example, the effort-monitoring system may be configured to determine the axle TE for each of the wheelsets. As another example, the wheelsets of the propulsion-generating vehicles may include a leading wheelset and a trailing wheelset that follows the leading wheelset. The effort-monitoring system may be configured to detect slippage of the leading wheelset at a designated point of the route. The effort-monitoring system may decrease the axle TE of the trailing wheelset to reduce a likelihood of slippage of the trailing wheelset occurring at the designated point. In some cases, the trailing wheelset may be a first trailing wheelset and the wheelsets may include a second trailing wheelset. The effort-monitoring system may be configured to increase the axle TE of at least one of the leading wheelset or the second trailing wheelset to compensate for the decreased axle TE of the first trailing wheelset.

In another embodiment, a method of operating a vehicle system is provided. The method includes controlling vehicle tractive efforts (TEs) individually produced by plural propulsion-generating vehicles to propel the vehicle system along a route. The TE that is individually produced by each of the propulsion-generating vehicles is associated with a previously defined limit that prohibited generation of the TE in excess of the previously defined limit. The method also includes allocating a system TE produced by the propulsion-generating vehicles in the vehicle system among the propulsion-generating vehicles such that the TE produced by at least one of the propulsion-generating vehicles exceeds the previously defined limit while the system TE remains at or below a system effort limit.

In another aspect, the system effort limit is based on the previously defined limit and a number of the propulsion-generating vehicles in the vehicle system.

In another aspect, the propulsion-generating vehicles include a leading vehicle and a trailing vehicle that follows the leading vehicle, wherein allocating the system TE includes determining that the TE of the leading vehicle is less than the previously defined limit and increasing the TE of the trailing vehicle so that the TE of the trailing vehicle exceeds the previously defined limit.

In one aspect, each of the propulsion-generating vehicles includes axle wheelsets that collectively provide the TE for the respective vehicle. Each of the wheelsets generates an axle TE. For instance, the wheelsets of the propulsion-generating vehicles include a leading wheelset and a trailing wheelset that follows the leading wheelset. The method may also include detecting slippage of the leading wheelset at a designated point of the route and decreasing the axle TE of the trailing wheelset to reduce a likelihood of slippage of the trailing wheelset occurring at the designated point.

In one embodiment, a system is provided that includes an effort-monitoring system configured to control operations of a vehicle system having discrete first and second vehicles that are linked directly or indirectly to each other in the vehicle system. The first and second vehicles are configured to provide respective first and second TEs to propel the vehicle system along a designated route. The first and second TEs provide a system TE that represents a combined effort of at least the first and second vehicles for propelling the vehicle system along the route. The system TE is prescribed by regulation to be at most a designated effort limit. The effort-monitoring system is configured to determine that one of the first or second TEs is insufficient for causing the combined effort to reach the system effort limit. The effort-monitoring system is configured to increase, in response to determining that one of the first or second TEs is insufficient, the TE of the other vehicle so that the system TE approaches the system effort limit.

In one aspect, the system effort limit may be equal to a sum of the first and second TEs when each of the TEs is generating a common TE. The effort-monitoring system may be configured to increase the second TE above the common TE when the effort-monitoring system determines that the first TE is insufficient. The second TE may be increased so that the system TE approaches the system effort limit. For example, the common TE may be the system effort limit divided by the number of vehicles that generate tractive efforts in the vehicle system.

In another aspect, the effort-monitoring system may be configured to receive route condition data that is representative of a route condition along the route and identify that an adverse route condition exists based on the route condition data. The effort-monitoring system may be configured to, in response to identifying that the adverse route condition exists, adjust tractive operations so that the first and second TEs are different and the system TE is approximately equal to the system effort limit.

In another aspect, the first vehicle may be a leading vehicle in the vehicle system and the second vehicle may be a remote vehicle that follows the leading vehicle in the vehicle system. In particular embodiments, the vehicle system is a rail vehicle system and the first and second vehicles are locomotives.

In another aspect, the vehicle system includes a first vehicle consist having the first and second vehicles and a second vehicle consist that is linked directly or indirectly to the first vehicle consist. The second vehicle consist has a plurality of vehicles that provide TEs to propel the vehicle system along the designated route.

In another aspect, each of the first and second vehicles includes wheelsets that collectively provide the TE for the respective vehicle. Each of the wheelsets generates an axle TE, wherein the effort-monitoring system may be configured to obtain axle data that represents the axle TEs. For example, the effort-monitoring system may be configured to determine that the axle TE for each of the wheelsets is based on a torque applied to the respective wheelset. As another example, the wheelsets of the first and second vehicles may include a leading wheelset and a trailing wheelset that follows the leading wheelset. The effort-monitoring system may be configured to detect slippage of the leading wheelset at a designated point of the route. The effort-monitoring system may decrease the axle TE of the trailing wheelset to reduce a likelihood of slippage of the trailing wheelset occurring at the designated point. In some cases, the trailing wheelset may be a first trailing wheelset and the wheelsets may include a second trailing wheelset. The effort-monitoring system may be configured to increase the axle TE of at least one of the leading wheelset or the second trailing wheelset to compensate for the decreased axle TE of the first trailing wheelset.

In another embodiment, a method of operating a vehicle system is provided in which the vehicle system has discrete first and second vehicles that are linked directly or indirectly to each other in the vehicle system. The method includes controlling the first and second vehicles to provide respective first and second TEs to propel the vehicle system along a designated route. The first and second TEs provide a system TE that represents a combined effort of at least the first and second vehicles for propelling the vehicle system along the route. The system TE is prescribed by regulation to be at most a designated effort limit. The method also includes determining that one of the first or second TEs is insufficient for causing the combined effort to reach the system effort limit and increasing, in response to determining that one of the first or second TEs is insufficient, the TE of the other vehicle so that the system TE approaches the system effort limit.

In one aspect, the system effort limit may be equal to a sum of the first and second TEs when each of the TEs provides a common TE. Determining that one of the first or second TEs is insufficient may include determining that one of the first or second TEs is less than the common TE.

In another aspect, the first vehicle may be a leading vehicle in the vehicle system and the second vehicle may be a remote vehicle that follows the leading vehicle in the vehicle system.

In another aspect, the method also includes receiving route condition data that is representative of a route condition along the route and identifying that an adverse route condition exists based on the route condition data. The method may also include adjusting, in response to identifying that the adverse route condition exists, tractive operations so that the first and second TEs are different and the system TE is approximately equal to the system effort limit.

In another aspect, the first and second vehicles include wheelsets that collectively provide the TE of the respective vehicle. Each of the wheelsets providing an axle TE in which the wheelsets include a leading wheelset and a trailing wheelset. The method also includes detecting slippage with respect to the leading wheelset at a designated point of the route and decreasing the axle TE of the trailing wheelset at the designated point.

In one embodiment, a system is provided that includes an effort-monitoring system configured to control operations of a vehicle system including a plurality of discrete vehicles that are directly or indirectly linked to each other in the vehicle system. The vehicle system includes a first wheelset and a second wheelset in which each of the first and second wheelsets provides a respective axle tractive effort TE for propelling the vehicle system along a designated route. The second wheelset is spaced apart from and follows the first wheelset when traveling along the route. The effort-monitoring system is configured to receive axle data that is representative of an operating condition of the first wheelset at a designated point along the route. The effort-monitoring system is configured to determine, based on the axle data, that slippage has occurred at the designated point along the route. The effort-monitoring system may be configured to decrease the axle TE of the second wheelset before the second wheelset passes the designated point along the route to reduce a likelihood of slippage occurring with respect to the second wheelset.

In one aspect, the plurality of discrete vehicles include a propulsion-generating vehicle. The propulsion-generating vehicle may include each of the first and second wheel sets.

In another aspect, the plurality of discrete vehicles include a first propulsion-generating vehicle and a second propulsion-generating vehicle. The first propulsion-generating vehicle includes the first wheelset and the second propulsion-generating vehicle includes the second wheelset. Optionally, the plurality of discrete vehicles may include a third propulsion-generating vehicle.

In another aspect, the effort-monitoring system is configured to decrease the axle TE of the second wheelset after a designated travel time. The designated travel time is based on a speed of the vehicle system, lengths of the discrete vehicles, and a tolerance of mechanical couplers that join the discrete vehicles.

In another aspect, the vehicle system may include a third wheelset having a respective axle TE. The effort-monitoring system may be configured to increase the axle TE of the third wheelset when the axle TE of the second wheelset is decreased. The axle TE of the third wheelset may be configured to compensate for the decreased axle TE of the second wheel set.

The effort-monitoring system is configured to determine whether the slippage occurred by at least one of detecting an abrupt change in wheel speed or determining a wheel creep for the corresponding wheelset in which the wheel creep is associated with slippage. The axle TE of the second wheelset may be decreased a designated amount. The designated amount may be based on the change in wheel speed or the wheel creep.

In another embodiment, a method of operating a vehicle system is provided in which the vehicle system has a plurality of discrete vehicles that are directly or indirectly linked to each other in the vehicle system. The method includes controlling first and second wheelsets to provide respective axle tractive efforts TEs for propelling the vehicle system along a designated route. The second wheelset is spaced apart from and following the first wheelset when traveling along the route. The method may also include receiving axle data that is representative of an operating condition of the first wheelset and determining that slippage has occurred with respect to the first wheelset at a designated point along the route based on the axle data. The method may also include decreasing the axle TE of the second wheelset before the second wheelset is at the designated point to reduce a likelihood of slippage occurring with respect to the second wheelset.

In one aspect, decreasing the axle TE of the second wheelset occurs after a designated travel time. The designated travel time may be based on a speed of the vehicle system, lengths of the discrete vehicles, and a tolerance of mechanical couplers that join the discrete vehicles.

In another aspect, the vehicle system includes a third wheelset having a respective axle TE. The method may also include increasing the axle TE of the third wheelset when the axle TE of the second wheelset is decreased. The axle TE of the third wheelset may be configured to compensate for the decreased axle TE of the second wheelset.

In one embodiment, a system is provided that includes a control system configured to control operations of a vehicle system having discrete first and second vehicles that are linked directly or indirectly to each other in the vehicle system. The first and second vehicles are configured to provide first and second TEs to propel the vehicle system along a designated route. The first and second TEs provide a system TE that represents a combined effort of the first and second vehicles for propelling the vehicle system along the route. The system TE is prescribed by regulation to be at most a designated effort limit. The control system is configured to determine that one of the first or second TEs is insufficient for obtaining the effort limit. The control system is configured to increase, in response to determining that one of the first or second TEs is insufficient, the TE of the other vehicle so that the system TE approaches the effort limit.

In another embodiment, a method of operating a vehicle system is provided in which the vehicle system has discrete first and second vehicles that are linked directly or indirectly to each other in the vehicle system. The method includes controlling the first and second vehicles to provide first and second TEs to propel the vehicle system along a designated route. The first and second TEs provide a system TE that represents a combined effort of the first and second vehicles for propelling the vehicle system along the route. The system TE is prescribed by regulation to be at most a designated effort limit. The method also includes determining that one of the first or second TEs is insufficient for obtaining the effort limit and increasing, in response to determining that one of the first or second TEs is insufficient, the TE of the other vehicle so that the system TE approaches the effort limit.

In another embodiment, a system is provided that includes a control system configured to control operations of a vehicle system including a plurality of discrete vehicles that are directly or indirectly linked to each other in the vehicle system. The vehicle system includes a first wheelset and a second wheelset in which each of the first and second wheelsets provides a respective axle TE for propelling the vehicle system along a designated route. The second wheelset is spaced apart from and follows the first wheelset when traveling along the route. The control system is configured to receive axle data that is representative of an operating condition of the first wheelset at a designated point along the route. The control system is configured to determine, based on the axle data, that slippage has occurred at the designated point along the route. The control system may be configured to decrease the axle TE of the second wheelset before the second wheelset passes the designated point along the route to reduce a likelihood of slippage occurring with respect to the second wheelset.

In another embodiment, a method of operating a vehicle system is provided in which the vehicle system has a plurality of discrete vehicles that are directly or indirectly linked to each other in the vehicle system. The method includes controlling first and second wheelsets to provide respective axle TEs for propelling the vehicle system along a designated route. The second wheelset is spaced apart from and following the first wheelset when traveling along the route. The method may also include receiving axle data that is representative of an operating condition of the first wheelset and determining that slippage has occurred with respect to the first wheelset at a designated point along the route based on the axle data. The method may also include decreasing the axle TE of the second wheelset before the second wheelset is at the designated point to reduce a likelihood of slippage occurring with respect to the second wheelset.

In another embodiment, a system comprises an effort-monitoring system configured to control operations of a vehicle system including a plurality of discrete vehicles that are directly or indirectly linked to each other in the vehicle system. The vehicle system includes a first wheelset and a second wheelset in which each of the first and second wheelsets provides a respective axle tractive effort (TE) for propelling the vehicle system along a designated route. The second wheelset is spaced apart from and follows the first wheelset when traveling along the route. The vehicle system also includes a third wheelset having a respective axle TE. The effort-monitoring system is configured to receive axle data that is representative of an operating condition of the first wheelset at a designated point along the route. The effort-monitoring system is also configured to determine, based on the axle data, that slippage has occurred at the designated point along the route, and to decrease the axle TE of the second wheelset before the second wheelset passes the designated point along the route to reduce a likelihood of slippage occurring with respect to the second wheelset. The effort-monitoring system is further configured to increase the axle TE of the third wheelset when the axle TE of the second wheelset is decreased, the axle TE of the third wheelset being configured to compensate for the decreased axle TE of the second wheelset.

Another embodiment relates to a method for operating a vehicle system having a plurality of discrete vehicles that are directly or indirectly linked to each other in the vehicle system. The method comprises controlling first and second wheelsets to provide respective axle tractive efforts (TEs) for propelling the vehicle system along a designated route. The second wheelset is spaced apart from and following the first wheelset when traveling along the route. The method further comprises receiving axle data that is representative of an operating condition of the first wheelset, determining that slippage has occurred with respect to the first wheelset at a designated point along the route based on the axle data, and decreasing the axle TE of the second wheelset before the second wheelset is at the designated point to reduce a likelihood of slippage occurring with respect to the second wheelset.

Another embodiment relates to a method for operating a vehicle system having a plurality of discrete vehicles that are directly or indirectly linked to each other in the vehicle system. The plurality of discrete vehicles includes a propulsion-generating vehicle that has first and second wheelsets. The method comprises controlling the first and second wheelsets to provide respective axle tractive efforts (TEs) for propelling the vehicle system along a designated route. The second wheelset is spaced apart from and following the first wheelset when traveling along the route. The method further comprises receiving axle data that is representative of an operating condition of the first wheelset, determining that slippage has occurred with respect to the first wheelset at a designated point along the route based on the axle data, and decreasing the axle TE of the second wheelset before the second wheelset is at the designated point to reduce a likelihood of slippage occurring with respect to the second wheel set.

Another embodiment relates to a method for operating a vehicle system having a plurality of discrete vehicles that are directly or indirectly linked to each other in the vehicle system. The plurality of discrete vehicles includes a first propulsion-generating vehicle and a second propulsion-generating vehicle. The first propulsion-generating vehicle includes a first wheelset and the second propulsion-generating vehicle includes a second wheelset. The method comprises controlling the first and second wheelsets to provide respective axle tractive efforts (TEs) for propelling the vehicle system along a designated route. The second wheelset is spaced apart from and following the first wheelset when traveling along the route. The method further comprises receiving axle data that is representative of an operating condition of the first wheelset, determining that slippage has occurred with respect to the first wheelset at a designated point along the route based on the axle data, and decreasing the axle TE of the second wheelset before the second wheelset is at the designated point to reduce a likelihood of slippage occurring with respect to the second wheelset.

Another embodiment relates to a method for operating a vehicle system having a plurality of discrete vehicles that are directly or indirectly linked to each other in the vehicle system. The method comprises controlling first and second wheelsets to provide respective axle tractive efforts (TEs) for propelling the vehicle system along a designated route. The second wheelset is spaced apart from and following the first wheelset when traveling along the route. The method further comprises receiving axle data that is representative of an operating condition of the first wheelset, determining that slippage has occurred with respect to the first wheelset at a designated point along the route based on the axle data, and decreasing the axle TE of the second wheelset before the second wheelset is at the designated point to reduce a likelihood of slippage occurring with respect to the second wheelset. Decreasing the axle TE of the second wheelset occurs after a designated travel time. The designated travel time is based on a speed of the vehicle system, lengths of the discrete vehicles, and a tolerance of mechanical couplers that join the discrete vehicles.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

What is claimed is:

1. A system comprising:
an effort-monitoring system including one or more processors configured to control operations of a vehicle system that includes discrete vehicles directly or indirectly linked to each other, the vehicle system including a first wheelset and a second wheelset that are mechanically coupled together and provide respective axle tractive efforts (TE) for propelling the vehicle system along a route, the second wheelset spaced apart from the first wheelset and following the first wheelset in a direction of travel of the vehicle system along the route;

wherein the effort-monitoring system is configured to receive axle data representative of one or more operating conditions of the first wheelset along the route, and determine that slippage of the first wheelset occurred along the route based on the axle data, wherein, responsive to determining that the slippage occurred, the effort-monitoring system is configured to reduce the axle TE provided by the second wheelset before the second wheelset reaches a point along the route at which the first wheelset experienced slippage to reduce a likelihood that the second wheelset experiences slippage at the point.

2. The system of claim 1, wherein the discrete vehicles of the vehicle system include a propulsion-generating vehicle that has both of the first and second wheelsets.

3. The system of claim 1, wherein the discrete vehicles of the vehicle system include a first propulsion-generating vehicle and a second propulsion-generating vehicle that are mechanically coupled together, the first propulsion-generating vehicle including the first wheelset and the second propulsion-generating vehicle including the second wheelset.

4. The system of claim 1, wherein the effort-monitoring system is configured to decrease the axle TE of the second wheelset after a designated travel time, the designated travel time being based on a speed of the vehicle system, lengths of the discrete vehicles, and a tolerance of mechanical couplers that join the discrete vehicles.

5. The system of claim 1, wherein the effort-monitoring system is configured to determine an amount of time to delay between the first wheelset traversing the point along the route and reducing the axle TE of the second wheelset based on a speed of the vehicle system and a distance between the first and second wheelsets.

6. The system of claim 1, wherein the effort-monitoring system is configured to increase the axle TE provided by the first wheelset after the first wheelset passes beyond the point along the route in response to reducing the axle TE provided by the second wheel set.

7. The system of claim 6, wherein the effort-monitoring system increases the axle TE provided by the first wheelset such that the increase in axle TE provided by the first wheelset is equivalent to the reduction in axle TE provided by the second wheelset.

8. The system of claim 1, wherein the vehicle system includes a third wheelset that is spaced apart from the second wheelset such that the second wheelset is disposed between the first and third wheelsets along a length of the vehicle system, wherein the effort-monitoring system is configured to increase an axle TE provided by the third wheelset in response to reducing the axle TE provided by the second wheelset.

9. The system of claim 1, wherein the one or more operating conditions of the first wheelset includes a rotational speed of one or more of a wheel, an axle, or a motor shaft of the first wheelset, wherein the effort-monitoring system is configured to determine that the slippage of the first wheelset occurred by detecting a change in the rotational speed of the one or more of the wheel, the axle, or the motor shaft that is not attributed to a change in a tractive effort or a braking effort of the vehicle system.

10. The system of claim 1, wherein the one or more operating conditions of the first wheelset includes both a rotational speed of one or more of a wheel, an axle, or a motor shaft of the first wheelset and a vehicle speed of the vehicle system along the route, wherein the effort-monitoring system is configured to determine that the slippage of the first wheelset occurred in response to a difference between the rotational speed and the vehicle speed exceeding a designated limit.

11. The system of claim 1, wherein the first and second wheelsets are controlled to provide the respective axle TE according to an operating plan that designates tractive and braking efforts for the vehicles of the vehicle system based on one or more of time or location along the route, wherein the effort-monitoring system is configured to deviate from the operating plan when reducing the axle TE provided by the second wheelset before reaching the point without revising the operating plan.

12. A method comprising:

controlling first and second wheelsets of a vehicle system to provide respective axle tractive efforts (TEs) for propelling the vehicle system along a route, the vehicle system including a plurality of discrete vehicles that are directly or indirectly mechanically linked to each other, the second wheelset spaced apart from the first wheelset and following the first wheelset in a direction of travel of the vehicle system along the route;

receiving axle data that is representative of one or more operating conditions of the first wheelset along the route;

determining, via one or more processors, that slippage of the first wheelset occurred along the route based on the axle data; and responsive to determining that the slippage occurred, reducing the axle TE provided by the second wheelset before the second wheelset reaches a point along the route at which the first wheelset experienced slippage to reduce a likelihood that the second wheelset experiences slippage at the point.

13. The method of claim 12, wherein the axle data that represents the one or more operating conditions of the first wheelset is received from at least one sensor configured to monitor one or more of a vehicle speed of the vehicle system along the route or a rotational speed of one or more of a wheel, an axle, or a motor shaft of the first wheelset.

14. The method of claim 12, wherein the one or more operating conditions of the first wheelset includes a rotational speed of one or more of a wheel, an axle, or a motor shaft of the first wheelset, wherein the slippage of the first wheelset at the point is determined by detecting a change in the rotational speed of the one or more of the wheel, the axle, or the motor shaft that is not attributed to a change in a tractive effort or a braking effort of the vehicle system.

15. The method of claim 12, wherein the one or more operating conditions of the first wheelset includes both a rotational speed of one or more of a wheel, an axle, or a motor shaft of the first wheelset and a vehicle speed of the vehicle system along the route, wherein the slippage of the first wheelset at the point is determined in response to a difference between the rotational speed and the vehicle speed exceeding a designated limit.

16. The method of claim 12, further comprising increasing the axle TE provided by the first wheelset after the first wheelset passes beyond the point along the route in response to reducing the axle TE provided by the second wheelset.

17. A vehicle system configured to travel along a route, the vehicle system comprising:

a first wheelset disposed on the vehicle system and configured to generate tractive effort for propelling the vehicle system along a route according to a first prescribed axle tractive effort (TE) designated in an operating plan, the first wheelset including a first motor, a first pair of wheels, and a first axle that mechanically couples the first motor to the first pair of wheels;

a second wheelset disposed on the vehicle system and configured to generate tractive effort for propelling the vehicle system along the route according to a second prescribed axle TE designated in the operating plan, the second wheelset including a second motor, a second pair of wheels, and a second axle that mechanically couples the second motor to the second pair of wheels, the second wheelset spaced apart from the first wheelset and following the first wheelset in a direction of travel of the vehicle system along the route; and one or more processors configured to receive axle data representative of one or more operating conditions of the first wheelset along the route, and determine that slippage of the first wheelset occurred along the route based on the axle data, wherein, responsive to determining that the slippage of the first wheelset occurred, the one or more processors are configured to reduce the tractive effort provided by the second wheelset below the second prescribed axle TE before the second wheelset reaches a point along the route at which the first wheelset experienced slippage to reduce a likelihood that the second wheelset experiences slippage at the point, and the one or more processors are configured to increase the axle TE provided by the first wheelset after the first wheelset passes beyond the point along the route in response to reducing the tractive effort provided by the second wheelset.

18. The system of claim 17, wherein the vehicle system includes multiple propulsion-generating vehicles directly or indirectly linked to each other, the first and second wheelsets disposed on a common one of the propulsion-generating vehicles.

19. The system of claim 17, wherein the vehicle system includes multiple propulsion-generating vehicles directly or indirectly linked to each other, the first and second wheelsets disposed on different ones of the propulsion-generating vehicles.

20. The system of claim 1, wherein, responsive to determining that the slippage occurred, the effort-monitoring system is configured to reduce the axle TE provided by the second wheelset to a non-zero TE without applying brakes to slow the vehicle system.

* * * * *